May 5, 1925.  
J. J. CONVERY  
TIRE MAKING MACHINE  
Filed July 27, 1914   8 Sheets-Sheet 7  
1,536,376
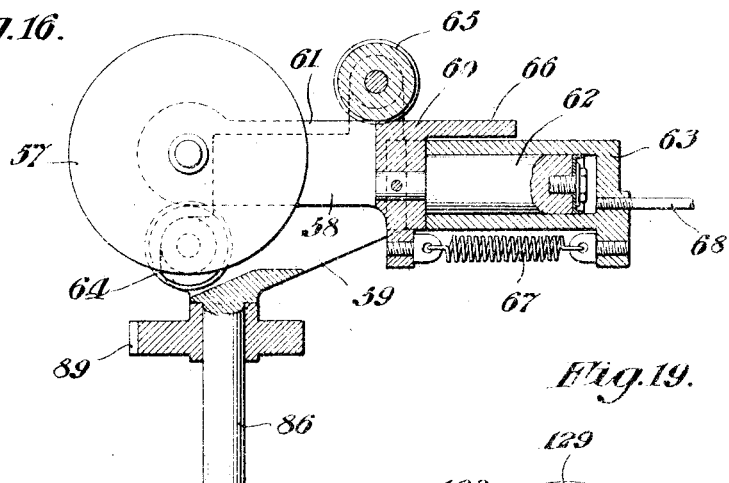
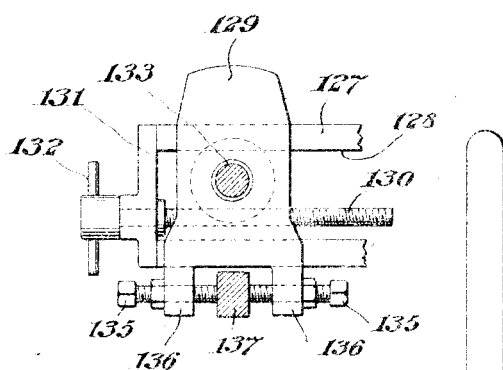
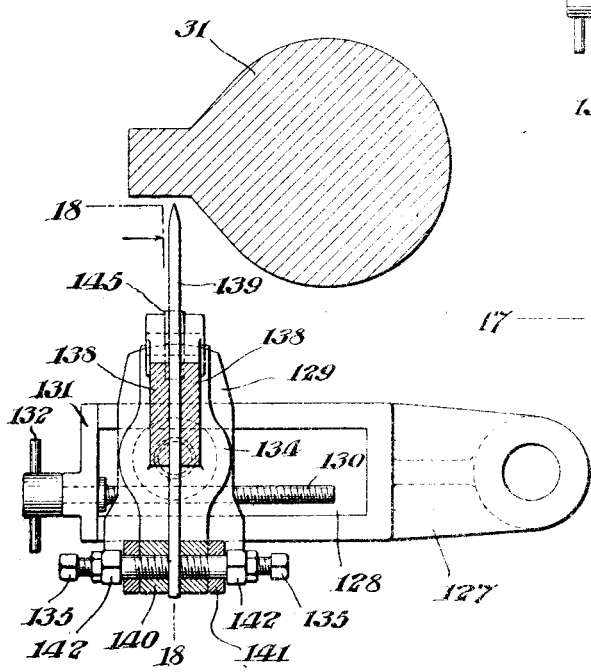
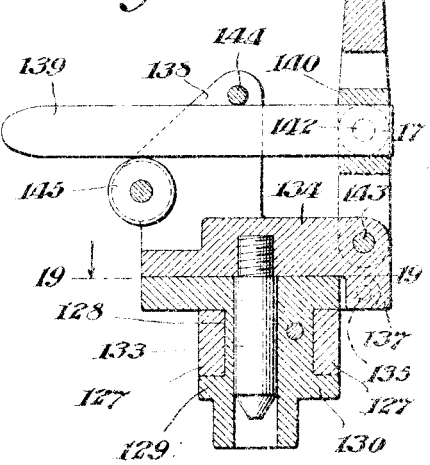
WITNESSES:  
P.E. Barnes  
James Atkins
INVENTOR:  
John J. Convery,  
BY  
Rogers, Kennedy & Campbell  
ATTORNEYS.

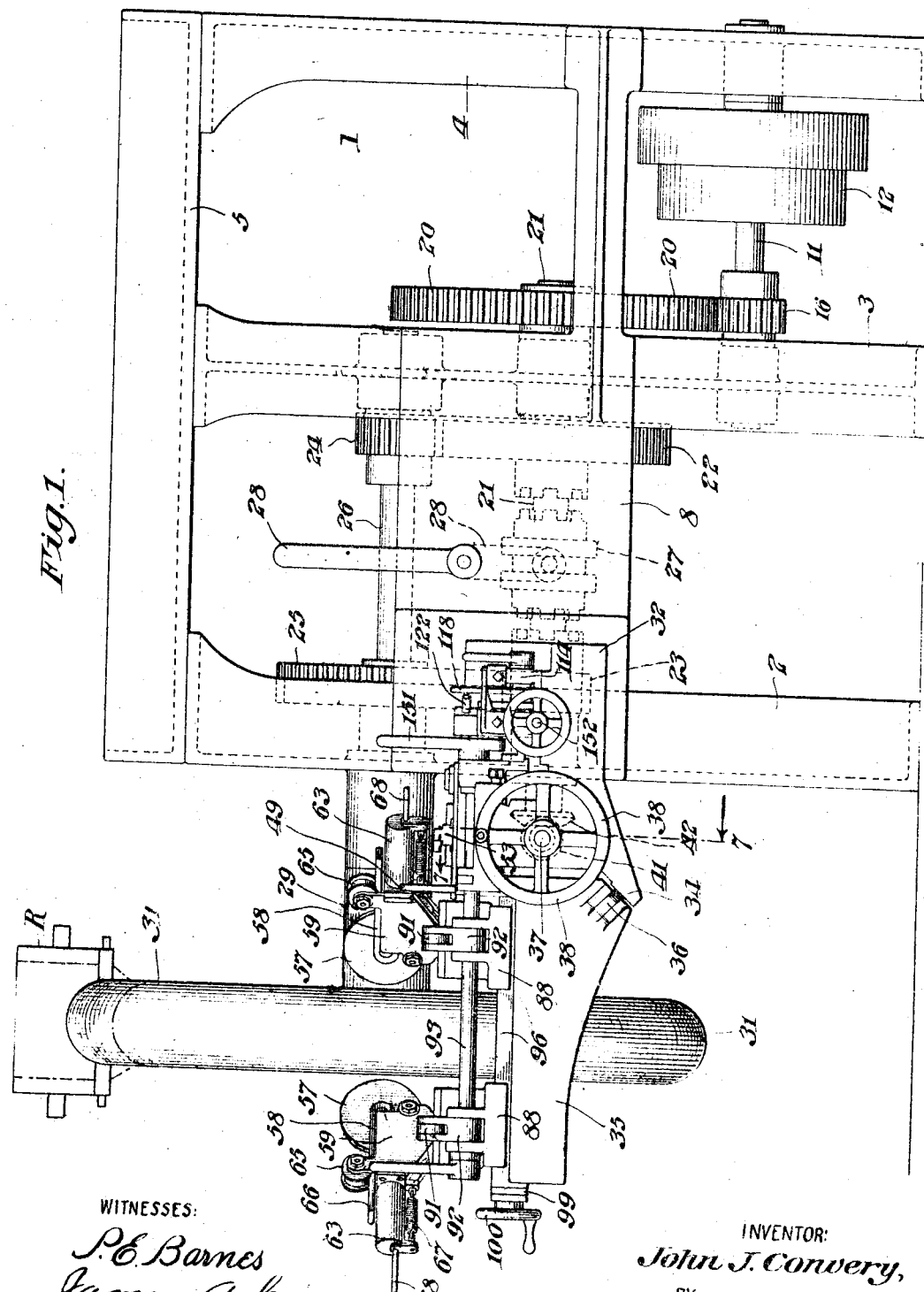

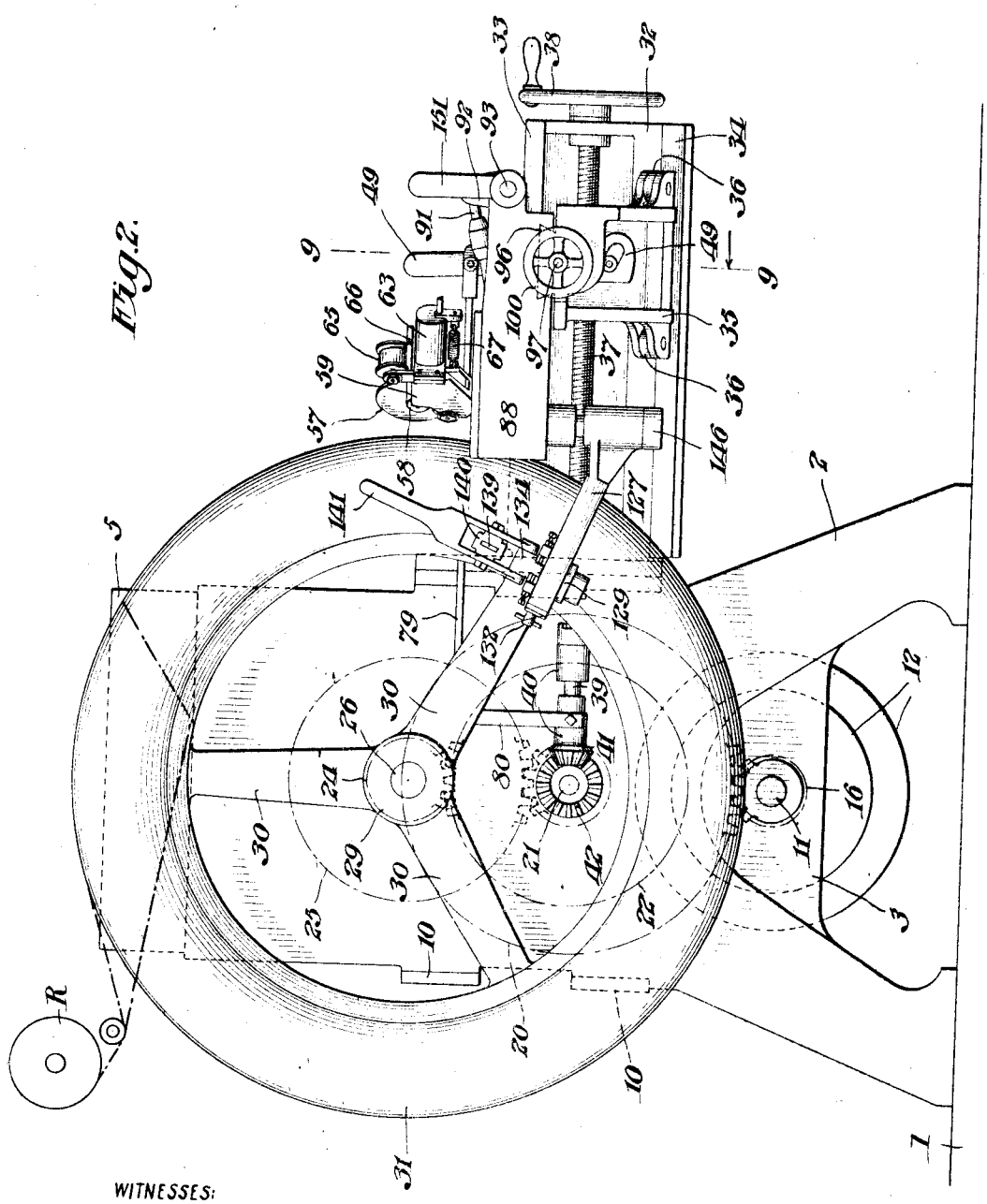

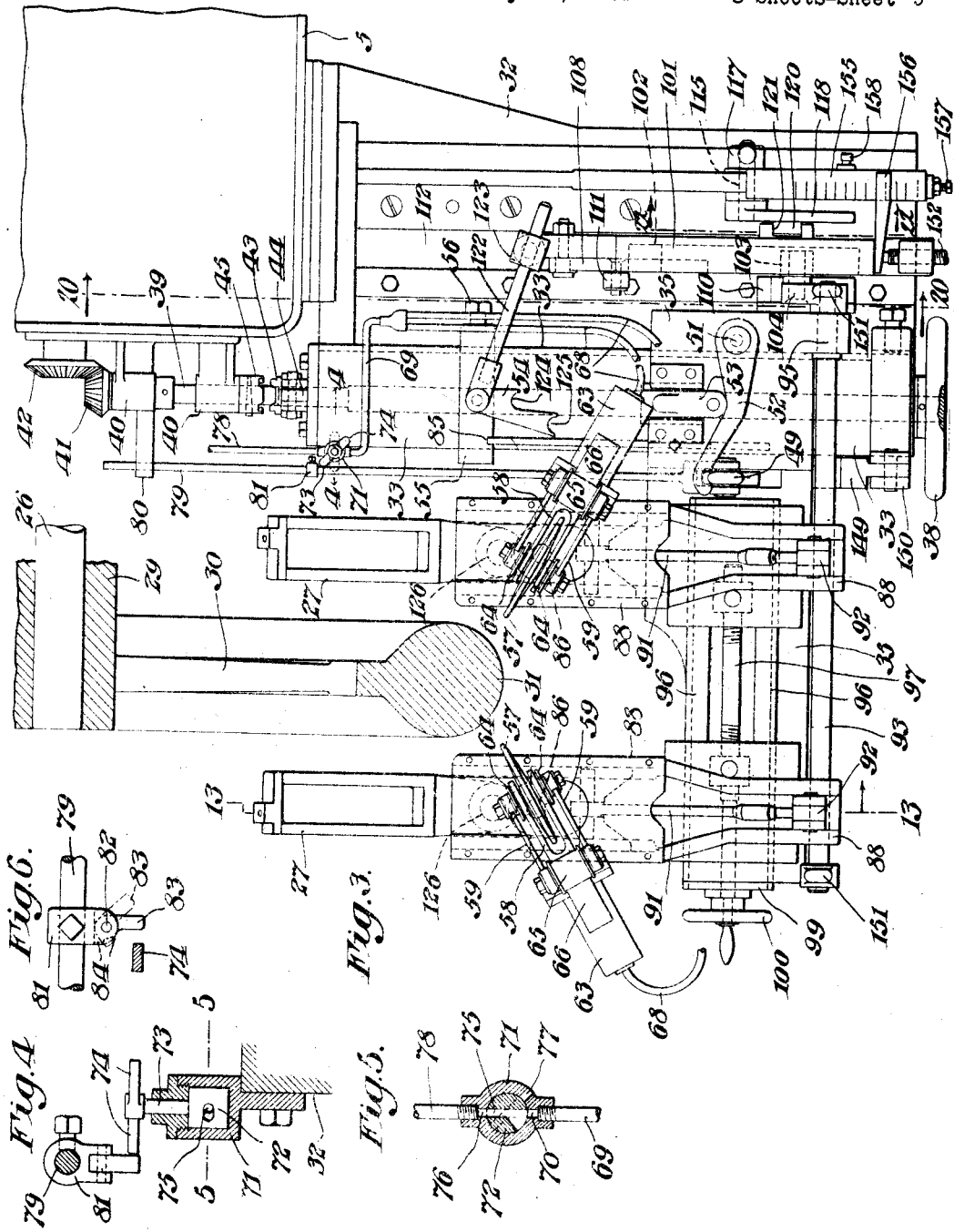

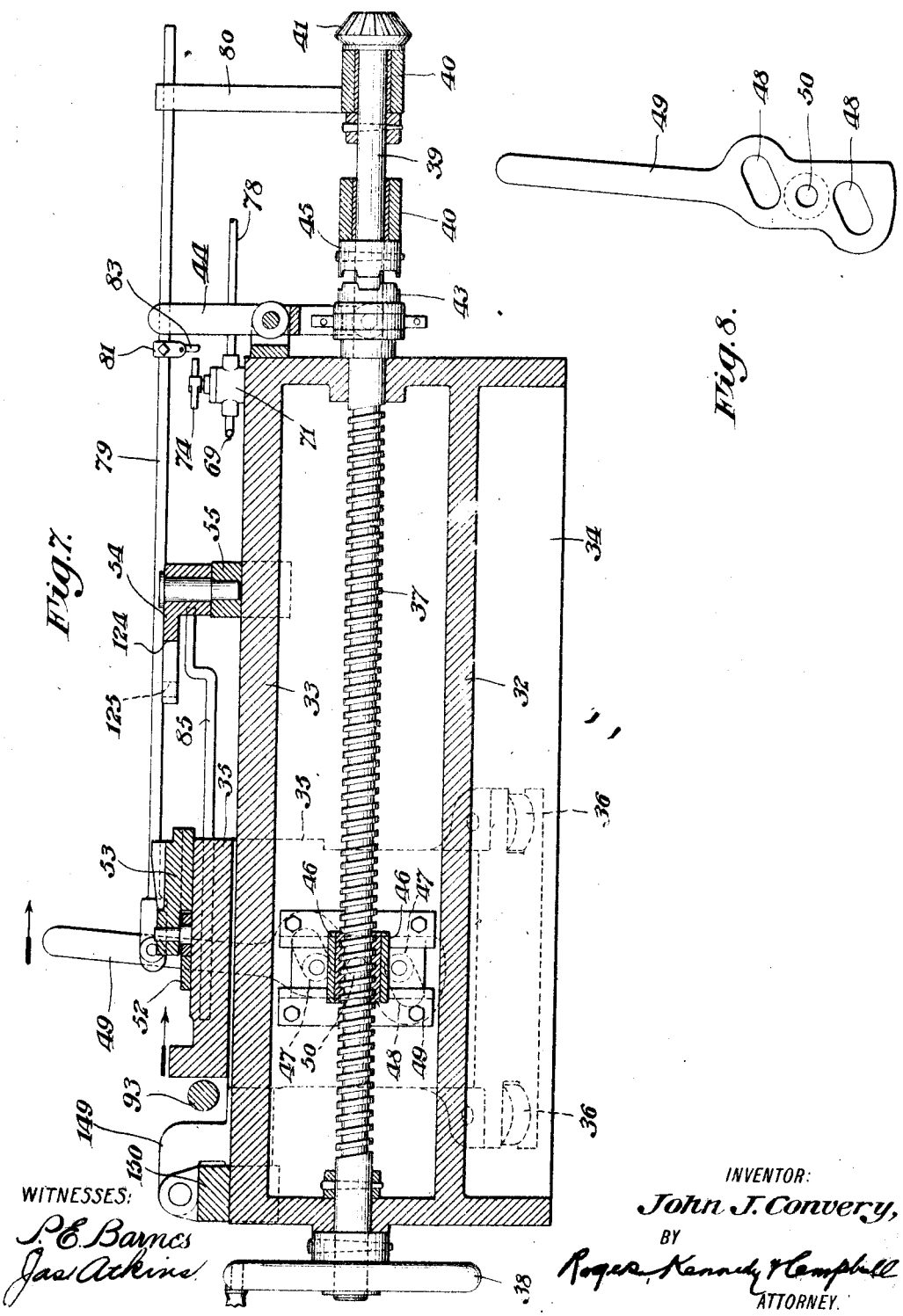

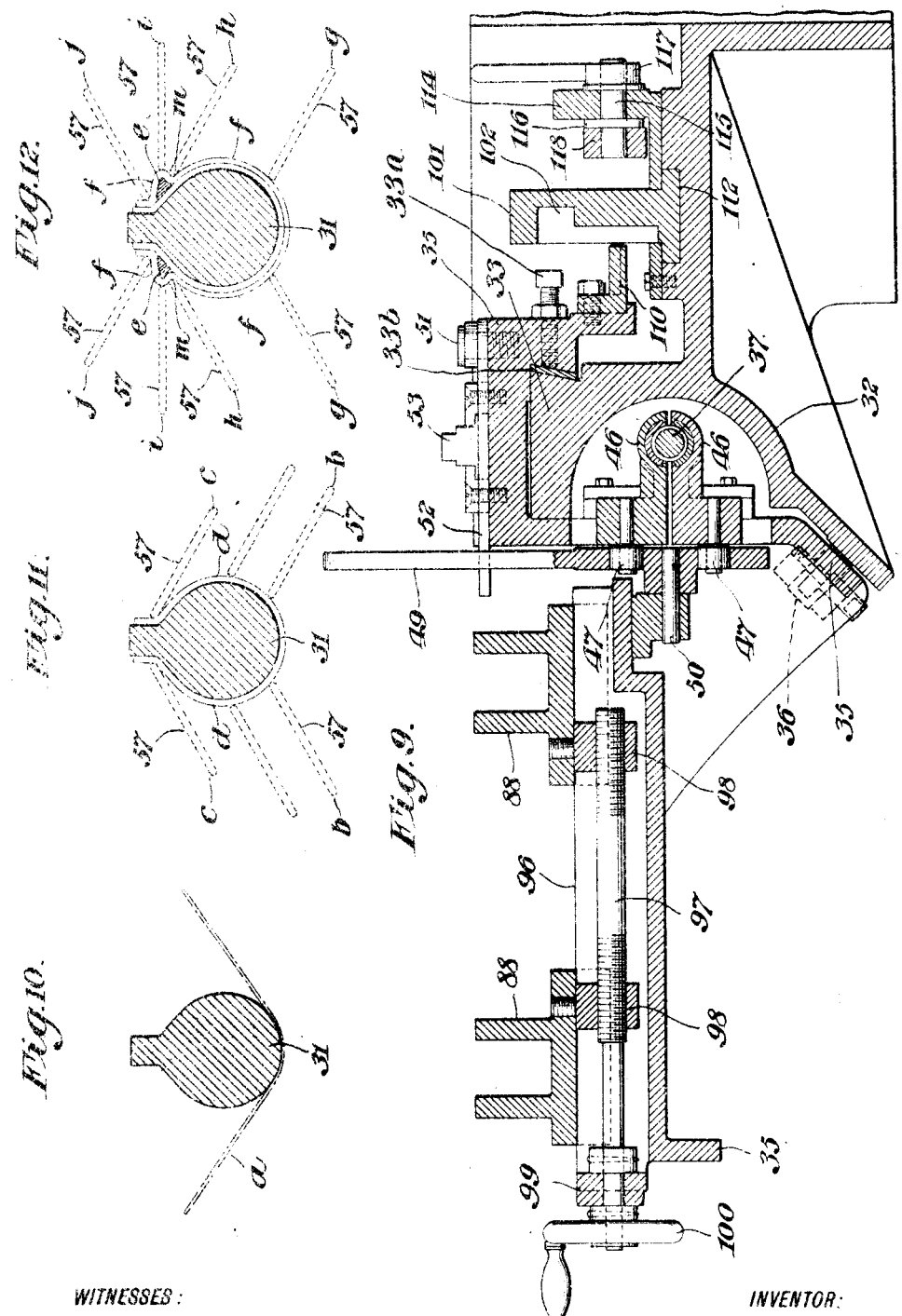

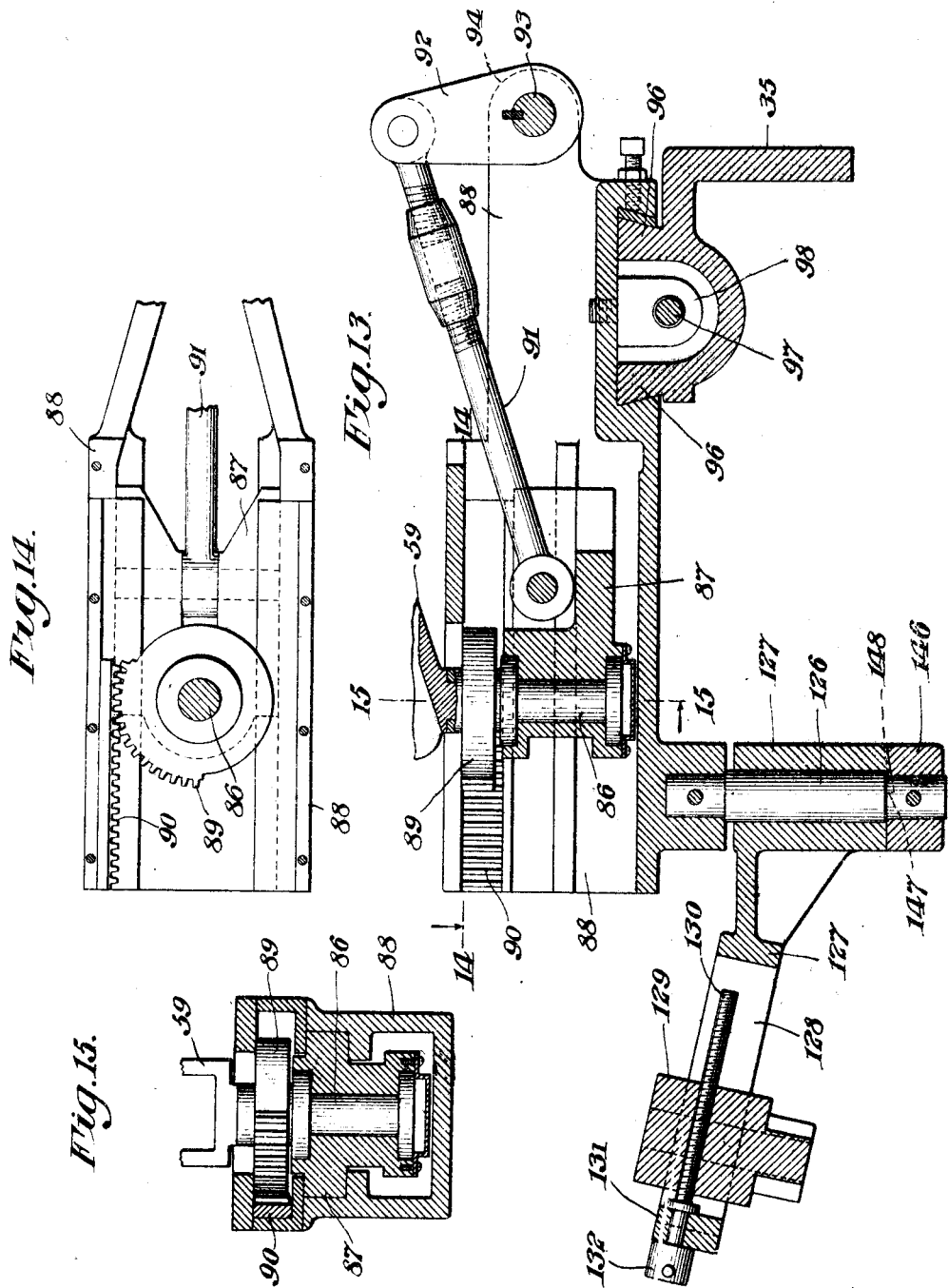

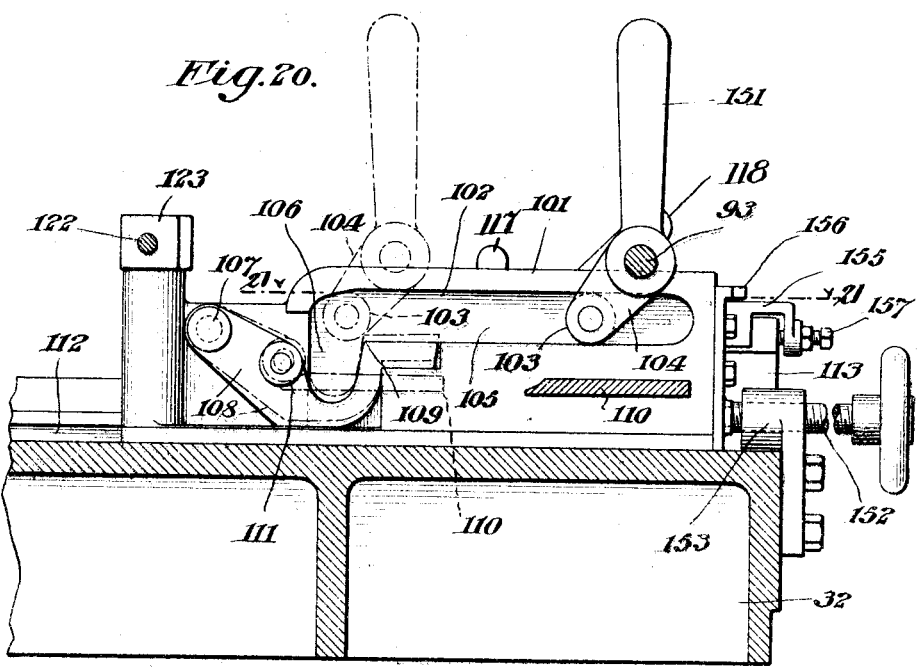
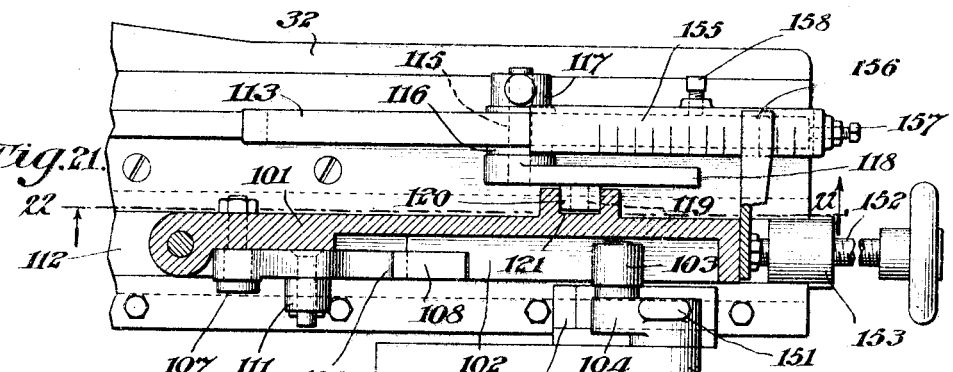
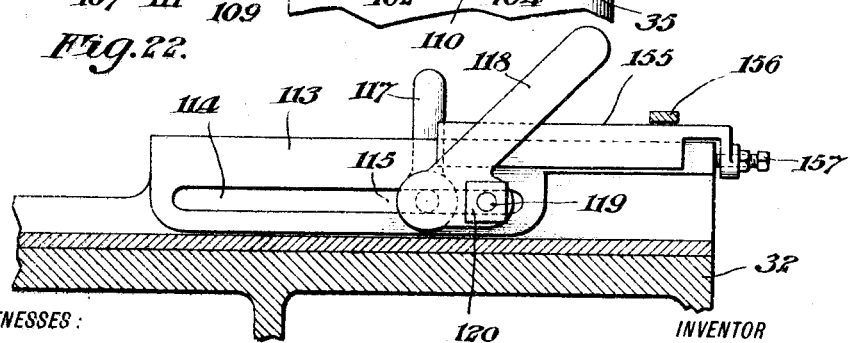

Patented May 5, 1925.

1,536,376

UNITED STATES PATENT OFFICE.

JOHN J. CONVERY, OF AKRON, OHIO, ASSIGNOR TO THE GOODYEAR TIRE & RUBBER COMPANY, A CORPORATION OF OHIO.

TIRE-MAKING MACHINE.

Application filed July 27, 1914. Serial No. 853,386.

*To all whom it may concern:*

Be it known that I, JOHN J. CONVERY, a citizen of the United States, residing at Akron, in the county of Summit and State of Ohio, have invented certain new and useful Improvements in Tire-Making Machines, of which the following is a specification, reference being had therein to the accompanying drawing.

This invention relates to tire-making machines and more especially to machines for producing what is commonly known in the trade as the "carcass" of a pneumatic-tire shoe or casing. This "carcass" comprises a plurality of superposed layers of fabric (with or without clincher-beads embedded therein) having the general configuration of the finished shoe.

In machines of this character, a rotatable tire-form or core is generally employed, and the "carcass" is formed around or upon the rotating core by rollers or other fabric-pressing members manipulated to roll, form or press a layer of tire-fabric upon the core, then a layer is superposed upon that, and finally, one or more layers are superposed upon the second layer and also folded around previously-inserted clincher-beads.

In such machines, the desideratum is to manipulate the fabric-pressing instrumentalities so that the successive layers of rubber-impregnated fabric will be properly positioned and shaped without wrinkles or creases, and this can best be effected by providing for the exertion of a uniform pressure of the pressing-instrumentalities against the tire-fabric as the same is being shaped on the core. Uniformity of operation results in a practically uniform and high-grade product.

It is a feature of my invention to provide for such uniformity and, moreover, to present a machine which, by reason of its simplicity of construction and convenient aggroupment of parts, may be manipulated by a single operator. Efficiency and speed of operation are likewise features of the invention. Practical tests have demonstrated that, with a machine constructed in accordance with my invention, a "carcass" of superior character may be produced in approximately half the time that is usually required for the purpose.

One object of the invention is to provide certain novel instrumentalities and mechanisms for automatically operating and controlling the actuation of the fabric-manipulating devices.

Another object is to provide means for accurately positioning the fabric-manipulating devices in relation to the tire-form or core and in predetermined relation to particular portions thereof.

Another object is to provide automatic means for predeterminately arresting the actuation of such devices and, then, to effect a return of the various operating instrumentalities to normal position.

Another object is to provide means for varying the extent of movement of the parts or the period of their operation.

Another object is to provide means for effecting adjustments whereby the relation of the parts may be varied for different sized products.

Another object is to provide power-operated means for actuating parts and mechanisms of the machine, whereby manual operation thereof is obviated, with consequent increase of speed and decrease of labor.

A more specific object of the invention is to provide a machine in which the fabric-rollers or pressing members may be automatically manipulated solely by the action of the machine itself during the entire rolling operation of each layer of fabric after as well as before the clincher-beads have been applied and, particularly, when the fabric-rollers are pressing the layer or layers of fabric around a suitable bead.

A still further specific object of the invention is to provide a novel, efficient and conveniently manipulated cutting-device for cutting or trimming the edges of the layers of fabric after they have been rolled and shaped upon the form or core.

Other objects and advantages will in part be obvious from the annexed drawings and will also in part be pointed out in the following description.

The invention resides broadly in the features of construction, in the combination of elements, and in the arrangement of parts, all as will be exemplified in the construction hereinafter set forth, and the scope of application of which will be indicated in the annexed claims.

In the accompanying drawings, forming a part of this specification, I have illustrated, by way of example, one of the many possible embodiments of the invention; it being manifest that other embodiments and utilizations, (employing the underlying features of my invention) fall within the spirit thereof and within the objects contemplated thereby.

In the drawings:

Figure 1 is a view in side elevation of a tire-making machine constructed in accordance with one embodiment of my invention;

Fig. 2 is a view in front elevation thereof;

Fig. 3 is a view in plan thereof, certain parts being broken away;

Fig. 4 is a view, in section, on the line 4—4, Fig. 3, showing (in detail) an air-valve forming an element in the presser-operating mechanism;

Fig. 5 is a view in section, on the line 5—5, Fig. 4, of the air-valve;

Fig. 6 is a fragmentary view, in detail, of a part of the valve-mechanism;

Fig. 7 is a view in vertical longitudinal section, on the line 7—7, Fig. 1, showing the presser-supporting carriage and the means for effecting its movements, including the feed-screw;

Fig. 8 is a view in detail of the operating lever for connecting the carriage to the feed-screw;

Fig. 9 is a view in vertical transverse section, on the line 9—9, Fig. 2, showing the presser-supporting carriage and certain of the parts sustained thereby;

Figs. 10, 11 and 12 are diagrammatic views, showing the different positions of the fabric-manipulating members or rollers in shaping the fabric around the tire-form—shown in section—and (in Fig. 12) around the clincher-beads;

Fig. 13 is a view in vertical longitudinal section, on the line 13—13, Fig. 3, of the presser-supporting carriage, of one of the presser-sustaining cross-heads mounted therein, and of the means for actuating the cross-heads; parts of the trimming mechanism also appearing therein;

Figs. 14 and 15 are fragmentary views in plan and vertical transverse section, respectively, on the lines 14—14 and 15—15, Fig. 13, showing the presser-sustaining cross-head, etc.;

Fig. 16 is a detail view in sectional elevation, of one of the fabric-manipulating rollers or pressing-members and its pneumatic operating-device, etc.;

Fig. 17 is a view in horizontal longitudinal section, on the line 17—17, Fig. 18, of parts of the trimming mechanism;

Fig. 18 is a view in vertical transverse section, on the line 18—18, Fig. 17, of the same;

Fig. 19 is a view in horizontal transverse section, on the line 19—19, Fig. 18, of the same;

Fig. 20 is a fragmentary view in vertical longitudinal section, on the line 20—20, Fig. 3, showing parts of the mechanism for effecting change in the degree of angularity of the pressing-rollers in relation to the tire-forms;

Fig. 21 is a fragmentary view in horizontal longitudinal section, on the line 21—21, Fig. 20, of said mechanism; and Fig. 22 is a fragmentary view, in vertical longitudinal section, on the line 22—22, Figs. 3 and 21.

Supporting structure.

The various devices and mechanisms, hereinafter described, are preferably sustained by a general supporting-structure which includes a main frame 1, standards 2, 3, and 4; a top-plate 5, and tie-bars 8 and 10 connecting the standards. The general form and dimensions of this may, of course, be varied.

Driving mechanism.

Certain of the aforementioned devices preferably receive motion from a common driving-mechanism sustained by the supporting-structure, and this includes a main driving-shaft 11 journaled in suitable bearings in the standards 3 and 4. On the shaft are mounted pulleys 12 (Fig. 1) by means of which it may be driven from any suitable source of power.

The main shaft 11 also carries a pinion 16 in mesh with a gear-wheel 20 that is fixed to a shaft 21 journaled in bearings in the standards 2 and 3. Loosely mounted on the shaft 21 are a gear-wheel 22 and a pinion 23 which mesh with a pinion 24 and a gear-wheel 25, respectively, fixed on a shaft 26 which is mounted to turn in bearings in the standards 2 and 3. Splined on the shaft 21 between the gear-wheel 22 and pinion 23 is a suitable clutch-collar 27 operated by a hand-lever 28 and adapted to be thereby shifted into engagement with either the hub of the gear-wheel 22 or the hub of the pinion 23 to cause one or the other to be rotated by the shaft 21. When the clutch-collar 27 is engaged with the gear-wheel 22, the shaft 26 will, through the gear-wheel and the pinion 24, be rotated at a comparatively high rate of speed. When, however, the clutch-collar is engaged with the pinion 23, the shaft 26 will, through this pinion and the gear-wheel 25, be rotated at a comparatively slow rate of speed.

Tire-form or core.

The shaft 26 extends beyond the standard 2 and has secured thereto a hub 29 provided with radial arms 30 (Figs. 2 and 3) and constituting a form-supporting structure. These arms carry an annular tire-form or core corresponding exteriorly to the interior of a pneumatic tire-shoe, the "carcass" of which is produced upon this tire-form or core in a manner presently to be explained. The shafts, gears, etc., aforementioned, constitute, (in part) the drive-mechanism for actuating the form.

*Presser-supporting carriage and fabric-manipulating mechanism.*

Juxtaposed to the tire-form and preferably sustained by the main frame, is a carcass-forming structure which includes the following mechanisms and instrumentalities: Secured to the tie-bar 8, or to any other appropriate portion of the main frame, is an outwardly-extending bracket 32 which may, if desired, be formed as an integral part of the frame. The bracket is provided with an upper guiding and steadying rib 33 and a lower track 34 for sustaining a presser-supporting and positioning carriage 35, this carriage being movable, under the control of mechanism presently to be described, in relation to the tire-form. As best seen in Fig. 9, the carriage is adapted for a sliding movement on the rib and is provided with anti-friction rollers 36 which roll upon the track 34 to facilitate the travel of the carriage. If, for any reason, it be desired to secure the carriage 35 to the guiding-rib 33, or to tighten it up to take up wear, the screw 33$^a$ may be utilized. This bears against a wear-strip 33$^b$.

Movement of the carriage on the steadying rib and track in relation to the tire-form may be effected in any desired manner; but I prefer to accomplish this by means of a threaded shaft or feed-screw 37 suitably journaled in the bracket 32. The outer end of the feed-screw may be provided with a hand-wheel 38 by means of which it may be turned in either direction. Means may also be provided for power-driving the screw: To this end, it terminates adjacent to and in axial alinement with a short shaft 39 mounted to turn in bearings 40 on the standard 2.

The shaft 39 is driven from the shaft 21 by a pair of bevel gear-wheels 41 and 42. The shaft 37 has a clutch-collar 43 splined thereon and adapted to be moved by a hand-lever 44, fulcrumed on the bracket 32, into and out of engagement with a clutch-collar 45 fixed on the shaft 39, whereby when the collar 43 is moved into engagement with the collar 45, the feed-screw 37 will be actuated by the power transmitted from the main shaft 11; and, when the collar 43 is disengaged from the collar 45, the feed-screw will cease to rotate.

Any suitable means for connecting the carriage to and disconnecting the same from the feed-screw may be provided. For instance, in the embodiment herein illustrated by way of example, the screw 37 is engaged by a horizontally-split two-part clamp-nut 46 (Figs. 7 and 9), the upper and lower parts of which are slidably mounted in ways in the carriage 35 and are movable toward and from each other and into and from engagement with the screw. Each part of the clamp-nut is provided with a projecting stud which carries a roller 47, and the rollers 47 are arranged in inclined slots 48 formed in a hand-lever 49 which is fulcrumed at 50 (between the slots 48) on the carriage 35. This lever and its slots 48 are so arranged that when its upper end is moved outwardly, the two parts of the clamp-nut 46 will be moved away from each other and, thus, out of engagement with the screw 37 and, when said upper end is moved inwardly, the two parts of the nut will be moved toward each other and into engagement with the screw.

By this means, the carriage is advanced toward the tire-form, such advancing movement being effected in at least two ways, namely, manually, by turning the hand-wheel 38 fast on the feed-screw, and by power transmitted to the feed-screw through the gears, shafts, etc., from the main driving mechanism. It will thus be seen that both the core-supporting structure and the presser-supporting carriage may be actuated by power and whereby their relation with respect to each other may be changed for purposes presently to be explained. The carriage may be given a receding movement to normal position by reversely rotating the feed-screw (when unconnected with the driving-mechanism) or by moving the carriage backward and away from the tire-form 31 by hand.

When the carriage 35 reaches a predetermined position in its advancing movement— and which position may be varied in a manner presently to be described—it is desirable to provide for automatically arresting such movement and this may be accomplished, for instance, by disconnecting the carriage from the feed-screw. To this end, means are provided for automatically disconnecting the two-part nut from the feed-screw, whereupon further advance of the carriage is stopped. For this purpose, I provide the following: Pivoted at 51 (Figs. 3, 7 and 9) to the top of the carriage 35 is an arm 52, the free end of which lies in the path of movement of the hand-lever 49 and adjacent the outer end of a roller on a block 53 which is slidable in suitable ways on the carriage 35. When the lever is moved inwardly to effect engagement of the nut 46 with the screw 37, it moves inwardly the arm 52 and therewith the block 53. After the carriage 35 has been moved inwardly by the screw 37 a predetermined distance, the block 53 engages a stop-block 54 disposed in the path of travel of the carriage and, as the carriage continues its inward or advancing movement, the block 53 slides in its ways and moves the arm 52 and, therewith, the hand-lever 49 outwardly and thereby disconnects the nut 46 from the screw 37. In consequence, such disconnection automatically arrests the further advancing movement of the carriage. The stop-block 54 is pivoted on a clamp-bar 55 which embraces the rib 33 of the bracket 32 and is secured thereto by a set screw 56. This stop block is adjustably held in place on its pivot by devices which will be hereinafter explained, and whereby the arresting position of the carriage may be varied, if desired.

Supported (by sustaining and actuating devices hereinafter described) on the carriage 25 and positionable thereby in relation to the tire-form 31 are fabric-manipulating devices which, in this instance, are primarily designed as pressing members or pressers and, by way of example, are illustrated as rollers 57. There are, preferably, a pair of these arranged in spaced relation, and which relation may be varied, if desired, in a manner presently to be explained. These fabric-manipulating devices are adapted to be positioned in respect to the tire-form, in part by the carriage and, in part, by other instrumentalities and devices presently to be described. The carriage is, therefore, a presser-supporting and positioning structure. The pressers or rollers 57 are manipulated with respect to the rotating form 31 and engage the sides of the successive layers of fabric previously placed around the same and roll said layers down upon the form, upon each other, and upon and over inserted annular beads. Each roller 57 is supported on a member or carriage 58 which is slidable on a bracket 59. Each member 58 comprises a body-portion 60 and a pair of spaced arms 61 projecting from the body-portion and straddling the roller 57 which is journalled on the arms 61. Secured to the body-portion 60 and projecting outwardly therefrom is a piston 62 which slides in a cylinder 63 formed on the bracket 59. The piston serves as a support and guide for the slidable member 58 and which is also supported and guided by a pair of rollers 64 journalled on the sides of the bracket 59 and engaging the bottoms of the arms 61, and by a roller 65 journalled on the sides of the bracket 59 and extending across and adapted to engage the tops of the arms 61, the body-portion 60, and an outward projection 66 thereon. The slidable members 58 and pressers or rollers 57 thereon are adapted to be moved toward and from the rotating tire-form 31 and, during their movement, are guided by the rollers 64 and 65 and the pistons 62 and cylinders 63.

Each roller 57 is pressed, projected, or thrust toward the form 31 and, thus, positioned in relation thereto by the introduction of a pressure-fluid, such as compressed air, into the outer end of its cylinder 63, and is withdrawn and, thus, positioned away from the form 31 (when the air pressure is released) by the action of a spring 67, one end thereof being connected to a projection on the outer end of the cylinder 63, and the other end being connected to a projection on the slidable member 58.

It will be understood that the presser-members 57 are, thus, pressure-operated and that the action of these presser fluid-pressure-devices is to effect a positioning of the presser-members in operative relation to the tire-form additional to, but independent of, their positioning as effected by the movement of the carriage. As already explained, the carriage effects (in part) such a positioning of these fabric-manipulating devices either toward or away from the tire-form, according to whether it is being advanced toward the same, or moved away therefrom. These fluid-pressure devices accomplish an additional positioning of the rollers and, moreover, maintain them resiliently in contact, or in contacting relation, with the fabric-covered form 31. The springs 67 effect a receding movement of the pressing-members 57 away from the form and are, thus, power-operated positioning-devices, also.

Means are provided for supplying pressure-fluid to and controlling the operation of these pressure-devices: To this end, the outer end of each pneumatic cylinder 63 is connected by a flexible pipe 68 to a pipe 69 which leads to the outlet-opening 70 in an air-valve 71. This air-valve (as shown in Figs. 4 and 5) comprises a body-portion secured to the bracket 32 and a head 72 rotatably fitted in the body-portion. The head 72 has a stem 73 extending therefrom, the stem carrying an arm 74 by means of which the head may be turned. The head is provided with a passageway 75 adapted to establish communication (as seen in Fig. 5) between the outlet-opening 70 and an inlet-opening 76 in the valve 71 when the arm 74 is turned to the full-line position shown in Fig. 3. The head 72, if turned, is adapted to close the inlet-opening 76 and to position the passageway 75 so as to establish communication between the outlet-opening 70 and a port 77 leading to the open air. This occurs when the arm 74 is turned to the dotted-line position shown in Fig. 3. Leading from the valve inlet-opening 76 is a pipe 78 connected to an air-supplying device and which maintains a constant air-pressure at the valve 71, such devices for the purpose being common and well known. It will thus be seen that when the arm 74 is in the full-line position, air will be supplied to the cylinders 63 to project the rollers 57 toward the tire-form 31 and against the action of the springs 67, and that when the arm 74 is in the dotted-line position, the air will be permitted to escape from the cylinders 63, whereupon the springs 67 will draw the rollers 57 away from the tire-form.

In a machine of this character, it is desirable to arrange for the operation of the pressure-devices—which position the presser-members 57 as aforementioned—in predetermined relation to the initiating and arresting of the advancing movements of the carriage: In the present instance, I avail myself of the operation of the hand-lever 49 (which controls the actuation of the clamp-nut 46) to set the air-valve 71: Therefore, the parts are preferably so related that, when the lever 49 is operated to engage the clamp-nut with the feed-screw 37 for setting the carriage 35 in motion inwardly, the valve-arm 74 is moved to the full-line position; and, when the carriage has traveled inwardly in its advancing movement to a predetermined position, the valve-arm 74 will be automatically moved to the dotted-line position, and for this purpose I provide the following: Pivoted to the lever 49 is a rod 79 (Figs. 3 and 7), fitted to slide through an aperture in an arm 80 upstanding from the bearing 40. This rod 79 carries a collar 81 (Figs. 6 and 7) to which is pivoted, at 82, the upper end of a short arm 83 which hangs normally in the full-line position shown in Fig. 6. This arm may move on its pivot 82 to the dotted-line position shown in said figure, being prevented from moving in the reverse direction by its stop-portion 84 engaging the collar 81. When the lever 49 is in the position where the clamp-nut 46 is held out of engagement with the feed-screw 37, the collar 81 occupies a position between the air-valve arm 74 and the lever 49, and said arm is in the dotted-line position shown in Fig. 3. Therefore, when the lever 49 is moved to effect engagement of the clamp-nut 46 with the feed-screw, the rod 79 and its collar 81 are moved to the position shown in Fig. 3, thereby causing the pivoted arm 83 to engage the valve-arm 74 and move it from the dotted-line position to the full-line position. The valve-arm 74 then remains in this position, whereupon an offset rod 85 (projecting from and moving with the carriage in the path of the arm 74) engages and automatically moves it back to the dotted-line position. This not only closes the valve 71 so that the air-supply is cut off, but, by opening the port 77 in the valve, permits the air to escape therethrough and, thus, from the cylinders 63. Practically at the same time, the hand-lever 49 is automatically moved in the opposite direction to disengage the clamp-nut 46 from the feed-screw 37, as previously explained. As the lever 49 and the rod 79 and its collar 81 move outwardly, the pivoted arm 83 rides over the valve-arm 74 and drops down to the full-line position shown in Fig. 6 for a succeeding operation.

Hereinabove, I have described how the fabric-pressing members are positioned in two different ways in relation to the tire-form, namely, by the peumatic or pressure-devices in projecting them toward and withdrawing them from the form, and by the carriage (during its advancing and receding movements) in disposing them in and out of proximity to the form. It is desirable to provide additional means for effecting their further positioning at certain stages of the pressing operation: and this third method of positioning contemplates the changing of the degree of their angular relation to the surface of the form and, thus, to each other: To this end, each bracket 59 is provided with a downwardly projecting pivot-stud 86 (Figs. 13 to 15) which is mounted to turn in an auxiliary carriage or presser-sustaining cross-head 87. Each of the cross-heads 87 is slidably mounted in guideways formed in a bracket or trunnion-member 88 supported by the carriage 35. The pivot-stud 86 of each bracket 59 carries a toothed wheel 89 which meshes with a rack 90 fixed to the adjacent wall of the bracket 88. In consequence, when the cross-head 87 is moved in its guideways, the wheel 89 and therewith the bracket 59 will be turned on a vertical axis formed by the pivot-stud 86 to change the angle of the pressing-roller 57 relatively to the tire-form 31. To actuate the cross-heads and, thereby, the pressing-rollers, each cross-head is connected by a rod 91 to an arm 92 splined on a rocker-shaft 93. This shaft is common to the two cross-head connecting-rods and is journaled in bearing 94 adjacent the front edge of the brackets 88 and, also, in a bearing 95 on the carriage 35. When the shaft 93 is rocked, the cross-heads 87 will be moved in their guideways relatively to the brackets 88 and carriage 35. Such movement of the cross-heads in one direction bodily moves the pressing-members 57 along the surface of the tire-form and also rotates them on their vertical axes, whereby their position in relation to their initial contact with the form is not only changed but their angular relation thereto is also changed. The instant of movement of the cross-heads is predetermined and is controlled by instrumentalities presently to be explained.

For different size tires, for instance, means are provided to vary the spaced relation of the pressing-rollers 57, and, this is accomplished by transversely adjusting their supporting and actuating mechanisms, as will now be explained:

The brackets 88 each embrace and are slidably fitted to a hollow dove-tail rib 96 (Fig. 9) on the carriage 35. The rib extends parallel to the axis of rotation of the tire-form 31 and the brackets 88 are adjustable on the rib 96 toward and from each other and, thus, toward and from the planes of the sides of the form 31, one bracket 88 being located on one side of the plane alining with one side of the form 31 and the other bracket 88 being located on the other side of a plane alining with opposite side of the form. To adjust the brackets 88 relatively, I provide a shaft 97 having a right-hand screw-thread engaged with a block 98 on one bracket 88 and a left-hand screw-thread engaged with a block 98 on the other bracket. The shaft 97 extends through an opening in a wall 99 of the carriage 35 and carries a hand-wheel 100 and collars engaging each side of the wall 99. When the wheel 100 is turned, the brackets 88 and, therewith, the fabric-rollers 57 will be uniformly adjusted either toward or away from each other, in accordance with the direction of movement of the wheel 100.

The means already referred to for controlling the instant and extent of movement of the cross-heads 87 and, thus, of the fabric-rollers 57 contemplates the following:

The rock-shaft 93 which governs the angles of these rollers is held against turning during a portion of the advancing movement of the carriage 35 and, then, during another portion of such movement of the carriage is caused to rotate, by a cam-block 101 (Figs. 3, 9, 20 and 21) supported on the bracket 32 and having a camway 102 therein in which is located a roller 103 carried by an arm 104 fixed to and depending from the right-hand end of the rock-shaft 93. The camway 102 has a horizontal portion 105 which operates to prevent the turning of the rock-shaft 93 during one stage of the travel of the carriage 35, and a downwardly-extending end-portion 106 which permits the roller 103 to descend and effect a rocking of the shaft 93 during another stage of the travel of the carriage. Pivoted to the side of the cam-block 101, as at 107, is a hook-shaped arm 108 having a corner 109 which is adapted to be raised into engagement with the roller 103 when it reaches the dot-and-dash line position shown in Fig. 20. When the carriage is in movement, this arm 108 is raised by a plate 110 outstanding from the right-hand side of the carriage and engaging the bottom of a roller 111 on the arm when the roller 103 reaches the dot-and-dash line position. The purpose of the arm 108 will be hereinafter explained in the description of the operation of the machine.

For reasons presently to be explained, the cam-block 101 is adjustable. To this end, it is slidable longitudinally in a guideway 112 in the bracket 32 and, thus, has at least two different and effective positions: In the position in which the cam-block is shown in the drawings, the roller 103 will travel both portions 105 and 106 of the camway 102 during the movement of the carriage 35 for one operation, as will be hereinafter explained. In the other position (not shown) which the cam-block occupies when adjusted toward the axis of rotation of the tire-form 31, the roller 103 will only traverse the horizontal portion 105 of the camway 102 for another operation, as will also be hereinafter explained. To adjust the cam-block to either of these two positions, I provide the following: Upstanding from the bracket 32 is a plate 113 (Figs. 21 and 22) having a horizontal slot 114 therein through which extends a stud 115 having a collar 116 for engaging one face of the plate 113 and having a nut 117 for engaging the other face of said plate. The stud 115 may be adjusted longitudinally in the slot 114 and clamped in positions of adjustment by the nut 117. Pivoted on the stud 115 is a hand-lever 118 carrying a square block 120 located within a vertical guideway 121 in the adjacent side of the cam-block 101. When the lever 118 is moved on its fulcrum (formed by the stud 115) toward the axis of rotation of the tire-form 31, the block 120 (working in the slot 121) will move the cam-block 101 in the same direction to its second position of adjustment, in which situation the roller 103 can only traverse the horizontal portion 105 of the camway 102 during the travel of the carriage 35.

During the operation of the machine as hereinafter described, the carriage 35 travels a predetermined distance before its movement is automatically arrested by the stop-block 54, and, in this instance, the cam-block 101 is adjusted so that the roller 103 will traverse both portions 105 and 106 of the camway 102. If, however, the carriage is to travel a shorter distance before it is automatically stopped by the stop-block 54, then the cam-block 101 is adjusted so that the roller 103 will only traverse the horizontal portion 105 of the camway 102. To accomplish this, the pivoted stop-block 54 is provided with a rod 122 which is slidably fitted in an opening in a block 123 pivoted on the top of one end of the cam-block 101. The stop-block 54 is also provided with two abutments 124 and 125 located at different distances from the pivot of the block and either of which may be brought into position to be engaged by the slidable block 53 on the carriage 35 when the cam-block 101 is moved. Therefore, when this cam-block is adjusted to the position shown in the drawings, the abutment 124 of the stop-block 54 will be in alinement with the slidable block 53 automatically to stop the carriage 35 in the desired first position; and, when the cam-block is adjusted toward the axis of rotation of the tire-form 31 and to its second position, the stop-block 54 will similarly be adjusted on its pivot to bring the abutment 125 into alinement with the slidable block 53 automatically to stop the carriage at the desired point for the required operation of the machine in the second position.

Trimming mechanism.

The different layers of tire-fabric having, by the instrumentalities described, been formed on the core, certain finishing operations are then in order. These contemplate cutting-devices for trimming the rough edges of the layers of fabric after being rolled or shaped around the form 31, and embody the following structure: Each bracket 88 is provided with a downwardly-extending stud 126 (Figs. 2, 13, 16, 17 and 18) on which is pivoted a bracket 127 with a guideway 128 formed therein. Slidably fitted to the guideway 128 is a cross-head or carriage 129. Extending through the carriage 129 is a screw-threaded spindle 130 mounted to turn in a bearing in a wall 131 of the bracket 127 and provided with a handle 132 by means of which it may be turned to adjust the cross-head 129 longitudinally of the bracket 127 and toward or from the axis of rotation of the form 31. Pivoted on the cross-head 129, by means of a stud 133, is a bracket 134 adapted to turn about the axis of the stud 133 and to be held in positions of adjustment by a pair of screws 135 extending through projections 136 on the cross-head 129 and engaging the respective sides of a lug 137 which extend from the bracket 134 to a position between the screws 135. This bracket is provided with a pair of upwardly-extending arms 138 between which is formed a guiding-slot for the reception of a knife 139 having its inner or cutting-edge located adjacent that portion of the form 31 at which it is desired to trim the rough edges of the layers of fabric. One end of the knife is secured (as by screws) to a block 140 which is pivoted to a hand-lever 141, said screws also serving as pivot-studs for the block. The lever 141 is fulcrumed at 143 on the bracket 134 and is adapted to be moved on such fulcrum to move the knife toward and from the form 31. The knife is not only guided by the slot formed between the arms 128 but it is also guided by a pin 144 extending between the arms above the knife and by an anti-friction roller 145 below the knife and journaled on a pin extending between the arms. The roller 145 takes the downward thrust on the knife 139 caused by its engagement with the fabric during the rotation of the form 31. By adjusting the carriage 129 on the bracket 127, and by adjusting the bracket 134 on the carriage 129, the position and angle of the knife 139 with respect to the form 31 may be changed as desired. The bracket 127 is supported by a collar 146 fixed to the stud 126 beneath the bracket. The collar 146 has a tooth 147 adapted to engage a tooth 148 on the bracket 127 and prevent the turning of the bracket 127 on the stud 126 when pressure is applied to the hand-lever 141 during the cutting operation.

Before the fabric-rolling operation, the bracket 127 and the parts carried thereby are removed from the cross-head 129 by withdrawing the stud 133, and the bracket 127 may then be raised to disengage the tooth 148 from the tooth 147 and move outwardly on the stud 126 to a position where it will not interfere with the fabric during the rolling operation. After the rolling operation, these parts are positioned for the cutting operation, as already explained.

Operation.

The general operation of the machine is as follows:

Figs. 10, 11 and 12 show, diagrammatically, the manner in which the layers or plies of fabric and the annular beads are placed upon the form 31 and also some of the different positions which the fabric-rollers 57 assume during the rolling operation.

Cement having been applied to the tire-form 31 in the usual manner, a strip of fabric forming the innermost layer or ply and supplied as from a stock-roller, such as R, Figs. 1 and 2, is stretched around the form, in the usual condition. The sides of strip project from the form, as indicated at $a$ in Fig. 10. When the layers are being applied to the form 31, it may be rotated at slow speed from the driving-shaft 11 by clutching the pinion 23 to the shaft 26.

After each layer of fabric has preliminarily been applied to the form 31, and in the condition shown in Fig. 10, the lever 28 is operated to engage the clutch-member 27 with the gear-wheel 22, thereby rotating the form 31 at a higher rate of speed.

The hand-lever 118 is then operated to adjust the cam-block 101 to its second position—that in which the roller 103 will traverse only the horizontal portion 105 of the camway 102, and in which instance the abutment 125 of the stop-block 54 will be in alinement with the slide-block 53. The air-valve operating rod 85 is also adjusted so that it will operate the valve-arm 74 at the same time that the slide-block 53 impinges against the abutment 125. The hand-lever 49 is then moved to engage the clamp-nut 46 with the feed-screw 37 and also to shift the rod 79 so that the valve-arm 74 will be moved to the full-line position (shown in Fig. 3) and open the valve 71 to permit supply of air to the cylinders 63. The fabric-rollers 57 normally are out of contact with the tire-form 31, and occupy the position illustrated in Fig. 3. When air enters the cylinders 63, the presser-rollers 57 are projected by the air-pressure toward and initially positioned in relation to the form 31. At the same time that the air is turned on, or rather and preferably, slightly after, the carriage 35 starts its advancing movement under the operation of the rotating feed-screw 37 and positions the pressing-members 57 against the layer of fabric and which position is indicated at $b$ in Fig. 11. The carriage continues its advancing movement until the slide-block 53 thereon engages the abutment 125 and operates the arm 52 and lever 49 to disconnect the clamp-nut 46 from the feed-screw 37 and automatically arrest further advancing movement of the carriage. As the carriage advances toward the tire-form, the straight portion 105 of the camway 102 prevents rocking of the shaft 93; the fabric-rollers 57 move from the position indicated at $b$ in Fig. 11 to the position indicated at $c$ therein; and the constant air-pressure within the cylinders 63 causes the rollers 57 to exert a uniform but resilient or cushioned pressure against the fabric and, following the contour of the rotating form 31, rolls the projecting sides of the fabric down upon the form, as indicated at $d$ in Fig. 11. When the advancing movement of the carriage 35 is automatically arrested and the air-supply to the pressure-devices automatically cut off, the valve-arm 74 is automatically moved to the position shown by dotted lines in Fig. 3 so that the air may escape from the cylinders 63 through the valve-port 77 and release the pistons, whereupon the springs 67 withdraw the pressing-rollers 57 from the fabric. The carriage 35 is then, by the means already described, moved back to starting position and against a stop 149 pivoted on a clamp-bar 150 secured to the rib 33 of the bracket 32. The carriage may, when moved back by hand, be repositioned by grasping two handles or arms 151 projecting from the rock-shaft 93.

The operation thus far described may be repeated and successive layers of fabric rolled down upon the form 31 and upon each other until the desired initial number of plies have been applied. It will be understood that the successive layers or plies of fabric will have been treated in the usual manner to render them sticky or tacky so that they will adhere together and to the annular beads $e$ (when they are formed or rolled upon the form 31) and upon each other and the beads. The annular beads $e$ (Fig. 12) are then properly placed, in any suitable manner, upon the outermost of the previously-applied layers of fabric, as shown in Fig. 12. The next operation is successively to place additional strips of fabric around those first placed upon the form 31 and, also, around the annular beads $e$, as indicated at $f$, Fig. 12. Before starting this operation, however, the hand-lever 118 is operated to adjust the cam-block 101 and stop-block 54 back to the position shown in the drawings, in which position the roller 103 will traverse both the horizontal portion 105 and the downwardly-extending end-portion 106 of the camway 102; the abutment 124 of the cam-block 54 will be in alinement with the slide-block 53; and the air-valve operating-rod 85 will be positioned so that it will operate the valve-arm 74 at the same time that the slide-block 53 impinges against the abutment 124. The hand-lever 49 is then again moved inwardly to engage the clamp-nut 46 with the feed-screw 37 and shift the rod 79 so as to cause the parts carried thereby to move the valve-arm 74 to the full-line position, shown in Fig. 3, and thereby open the valve 71 and permit supply of air to the cylinders 63 for projecting the pressing-rollers 57 toward the last layer of fabric placed around the tire-form 31. The carriage 35 then advances under the operation of the feed-screw 37 and continues its advancing movement until the slide-block 53 engages the abutment 124 and operates the arm 52 and lever 49 automatically to arrest further inward movement of the carriage. As the carriage starts its advancing movement, the pressing-rollers 57 are thereby positioned relatively to, and brought into engagement with, the fabric, such position being indicated at $g$ in Fig. 12. During the initial inward movement of the carriage 35, the roller 103 traverses the straight horizontal portion 105 of the camway until just before it reaches the dot-and-dash line position shown in Fig. 20. During this portion of the travel of the carriage, the fabric-rollers 57 move from the position indicated at $g$, Fig. 12, to the position indicated at $h$ therein, and form and shape the fabric around the main body of the form 31 until it reaches the beads $e$. At this point, the plate 110 on the carriage 35 engages the bottom of the roller 111 and raises the arm 108 into engagement with the roller 103, as shown by dot-and-dash lines in Fig. 20; and, as the carriage continues its advancing movement, the roller 103 traverses the downwardly-extending portion 106 of the camway 102, rocks the shaft 93, and thereby moves the presser-sustaining cross-heads 87 inwardly with respect to the carriage 35. The effect of this operation is to cause the toothed-wheels 89 to engage the racks 90 and move the brackets 59 on their axes formed by the pivot-studs 86 so that the angular relation of the rollers 57 to the tire-form will be changed from that indicated at $h$ to that indicated at $i$ and $j$ in Fig. 12, and, moreover, the rollers 57 in addition to being given a rotative movement are bodily moved from the position indicated at $h$ to the position indicated at $j$. While these movements of the rollers 57 are being effected, they are, of course, maintained against the fabric by the air-pressure in the cylinders 63 and are thereby similarly maintained while following the contour of the beads $e$ so that they may also roll or shape the fabric over the beads. It is to be understood that the contour of the camway 102 where its horizontal portion 105 joins its downwardly-extending portion 106 is such that the presser-rollers 57 are held in the corners $m$ formed by the beads $e$ a short period of time before the rollers continue over the beads. This operation effects the formation of the desired distinct corners or grooves $m$. It is while the rollers are held in the corners $m$ that the corner 109 of the arm 108 is pressed against and caused to follow the roller 103; and the purpose of this arm 108 is to take the back pressure against the roller 103 in rolling the corners or grooves $m$. As the presser-rollers 57 reach the position indicated at $j$ in Fig. 12, the abutment 124 and slide-block 53 operate automatically to stop the carriage 35; and, at the same time, the rod 85 moves the valve-arm 74 to the dotted-line position in Fig. 3, closes the valve-inlet-opening 76, opens the valve-port 77, permits the air to escape from the cylinders 63, and enables the springs 67 to draw the rollers 57 away from the fabric. This done, the carriage is given a receding movement which causes the shaft 93 to be rocked to bring the roller 103 back into the horizontal portion 105 of the camway 102, the carriage 35 being moved back to the position shown in the drawings against the stop 149. These operations are continued until the desired number of layers or plies of fabric have been applied over as well as under the beads $e$.

After the final layer of fabric has been applied, the brackets 127 carrying the cutters 139 are moved into operative position and the cross-heads 129 and brackets 134 are adjusted thereon to bring the cutting edges of the knives 139 into position just inwardly of the beads $e$ and where it is desired to sever the rough, inwardly-projecting edges of the fabric. The levers 141 are then forced by hand toward the rotating tire-form 31, causing the cutting edges of the knives 139 to sever the rough edges of the fabric. The "carcass" is then complete and may then be removed from the form 31 in the usual manner.

Different sized tire-forms or cores may, of course, be applied to the core-supporting structure, aforementioned, for the production of "carcasses" of different sizes; and various parts of the machine may be adjusted so that the operations hereinbefore described may take place with respect to the forms of different sizes, and, for this purpose, in addition to those previously referred to, the following adjustments may be made: The general position of the cam-block 101 may be adjusted by a screw 152 when the stud 115 is adjusted in the slot 114, the screw 152 being threaded through a block 153 on the bracket 32 and forming an abutment for the outer end of the cam-block 101; the bar 55 may be adjusted on the rib 33 of the bracket 32 to adjust the position of the stop-block 54 and be held in position by its set-screw 56; the collar 81 may be adjusted on the rod 79 and held in place by its set-screw; and the rod 85 may be longitudinally adjusted on the carriage 25 and held in place by its set-screw.

To facilitate the setting of the cam-block 101 accurately with respect to forms of different sizes, the top of the plate or rib 113 may be provided with an indication-plate 155 having appropriate marks thereon corresponding with tire-forms of different sizes; and the cam-block 101 may be provided with an indicator-arm 156 projecting over the marks on the plate 155 and adapted to move over the same to indicate the correct positions for the cam-block 101 when it is adjusted. The indicator-plate 155 is also adjustable by means of a screw 157 and is held in position by a set-screw 158.

From the foregoing, it will be perceived that I have devised a tire-making machine which is well adapted to achieve the several objects and ends in view. The structure, as a whole, is exceedingly simple and compact in form, it is capable of producing "carcasses" with great rapidity, and the product thus produced is of superior grade in that the successive plies of fabric are superposed one upon the other evenly and uniformly; each "carcass" is uniform with others; and different sizes of tires can be formed upon the same machine. As many changes can be made in the construction and many widely different embodiments of the invention can obviously be made without departing from its spirit, it is intended that all matter contained in the foregoing description and shown in the accompanying drawings shall be interpreted as illustrative and not in a limiting sense; hence, the language employed in the following claims is intended to cover all of the generic and specific features of the invention.

What I claim is:

1. A tire-making machine including a support, a fabric-manipulating device carried thereby and having both longitudinal and angular movements, means for automatically actuating said device to effect its angular movement, and means for restoring the device to normal position.

2. A tire-machine including a support, a fabric-manipulating device carried thereby and having both longitudinal and angular movements, and fluid-pressure-operated means for automatically actuating said device for one of its movements and thereby effect constant and predetermined action thereof.

3. A tire-making machine including a support, a fabric-manipulating device carried thereby and having both longitudinal and angular movements, and means for automatically actuating said device to effect its angular movement and for restoring the device to normal position.

4. A tire-making machine including a carriage, a fabric-manipulating device carried thereby and including a fabric-roller having both longitudinal and angular movements, fluid-pressure-operated means associated with the carriage for automatically actuating the device for one of said movements independently of the carriage, and means for restoring the device to normal position.

5. A tire-making machine including a carriage, a fabric-manipulating device carried thereby and movable therewith and having both straightaway and angular movements, and automatic means active on said device for effecting one of its movements additional to its movement with the carriage.

6. A tire-making machine including a support, a fabric-manipulating device including a fabric-roller carried thereby and having both longitudinal and angular movements, fluid-pressure-operated means for automatically actuating the device for one of the movements, and quick-return means for restoring the device to normal position.

7. A tire-making machine including a support, a fabric-manipulating device having a straightaway positioning movement on the support and also an angular, core-conforming movement, automatic means for effecting the straightaway positioning movement, and automatic means for effecting the angular movement.

8. A tire-making machine including a carriage, a fabric-manipulating device carried by and movable with the carriage and having movement in a plurality of directions, and automatic means for actuating said device in each of its said plurality of directions of movement.

9. A tire-making machine including a carriage, a fabric-manipulating device carried by and movable with the carriage and having movement in a plurality of directions, and automatic means for actuating said device in each of its said plurality of directions of movement, said means including pressure-fluid-operated mechanism associated with the device.

10. A tire-making machine including a carriage, a member-sustaining element mounted thereon, a fabric-pressing-member mounted upon the element, a pressure-fluid device juxtaposed to such element and including means for introducing a motive fluid to the device to actuate the pressing-member in one direction, and independent means for returning the presser-member to normal position.

11. A tire-making machine including a carriage, a member-sustaining element mounted thereon, a fabric-pressing-member mounted upon the element, a pressure-fluid device juxtaposed to such element and including means for introducing a motive fluid to the device to actuate the pressing-member.

12. In a tire-making machine, a support, a traveling sustaining-structure mounted thereon, power-operated means for traversing said structure on the support, fabric-manipulating devices carried by the structure, and fluid-pressure-operated means including an instrumentality for introducing a motive fluid to the fluid-pressure-operated means for actuating the fabric-manipulating devices.

13. In a tire-making machine, a support, a carriage movable thereon, spaced-apart fabric-manipulating devices carried thereby and having both longitudinal and angular movements, pneumatically-operated means for actuating said devices for one of the movements, and independent means for varying the relation of the devices with respect to each other.

14. In a tire-making machine, a traveling support, fabric-pressing members mounted thereon, pneumatic devices connected to the pressing-members for actuating the same, conduits for a pressure-fluid leading to said pneumatic-devices, valve-mechanism for controlling the passage of the pressure-fluid to said pneumatic-devices, manually-operated means for operating said valve-mechanism, and automatic means for actuating said valve-mechanism.

15. A tire-making machine including a traveling supporting-structure, power-operated driving means for operating the same, fabric-pressing instrumentalities carried by and movable with the structure and having movement in a plurality of directions, and fluid-pressure-operated means associated with the supporting-structure and operable to actuate the instrumentalities in at least one of the directions of their movement.

16. A tire-making machine including a supporting-structure comprising a main-frame, a carriage movable thereon, means for effecting an advancing movement of the carriage including both manually-operated and power-driven instrumentalities, fabric-manipulating instrumentalities carried by and movable with the carriage and having movement in a plurality of directions, and fluid-pressure-operated means associated with the carriage and operable to actuate the manipulating instrumentalities in at least one direction of their movement.

17. A tire-making machine including a supporting-structure, a carriage movable thereon, automatic means for effecting movement of the carriage on the structure, fabric-pressing-members carried by and movable with the carriage and having movement in a plurality of directions, and automatic means operating irrespective of the movement and position of the carriage for actuating the pressing-members in a definite and predetermined manner in at least one of their plurality of directions of movement.

18. A tire-making machine including a supporting carriage, fabric-pressing-rollers carried by and movable with the carriage, automatic means for effecting movement of the carriage, and independent automatic means operating irrespective of the movement and position of the carriage for positively actuating the pressing-rollers in a predetermined relation to varying positions of the carriage.

19. A tire-making machine including a tire-forming core, a support associated therewith, a fabric-manipulating device sustained by the support, and fluid-pressure-operated means for actuating the device in relation to the core and whereby a constant, definite and predetermined pressure is applied to the surface of the core.

20. A tire-making machine including a support, a tire-form juxtaposed thereto, fabric-manipulating devices associated with the tire-form, and means operated by fluid-pressure for independently actuating the devices radially toward and in relation to the form and operable to produce a definite, predetermined pressure at opposite sides of the core.

21. A tire-making machine including a tire-forming core, a supporting-carriage having a to-and-fro movement in relation thereto, fabric-pressing rollers carried by and movable with the carriage and having both radial and angular movements in respect to the core, automatic means for effecting a traveling movement of the carriage, and automatic means for effecting both radial and angular movement of the fabric-pressing rollers in respect to the core.

22. A tire-making machine including a support, a fabric-pressing member on the support, a fabric-covered bead-carrying tire-form, juxtaposed to the pressing-member and with which the pressing-member is normally out of contact, and power-operated means for automatically moving the member toward and into engagement with the form, then effecting its movement along the surface thereof to a predetermined point, and then continuing its travel beyond that point.

23. A tire-making machine including a traveling support, an automatically-actuated fabric-pressing member on the support, a fabric-covered bead-carrying tire-form associated with the support, and power-operated means for automatically moving the member toward and along the surface of the fabric on the core and over a bead mounted thereon as a continuous and uninterrupted movement.

24. A tire-making machine including a support, a fabric-pressing member on the support, a fabric-covered tire-form juxtaposed to the support, and power-operated means for effecting a radial movement of the member toward and along the surface of the fabric and then over a bead mounted thereon, the pressing movement of the member being definite, continuous and under the action of the power-operated means along the side of the form and also over the bead thereon.

25. A tire-making machine including a support, a fabric-engaging member on the support, a tire-form juxtaposed to the pressing-member, power-operated means for effecting a cycle of operation of said member to cause it to move radially in relation to the form and engage fabric upon the form, and, then, after the pressing-members has been returned to starting position and a bead has been positioned on the form and additional fabric has been stretched thereover to overlie the bead, effecting a second movement of the member along the surface of that fabric, such engaging movement of the member being continuous and under the action of the power-operated means along the sides of the form and entirely over the bead.

26. A tire-making machine including a support, a fabric-pressing member on the support, a tire-form juxtaposed to the pressing-member, power-operated means for effecting a cycle of operation of said member to move it radially in relation to the form and to press fabric upon the form and, then, after the pressing-member has been returned to starting position and a bead has been positioned on the form and additional fabric has been stretched thereover to overlie the bead, effecting a second movement of the member along the surface of that fabric, such pressing movement of the member being continuous and under the action of the power-operated means along the sides of the form and entirely over the bead.

27. A tire-making machine including a support, a set of fabric-pressing members on the support, a tire-form juxtaposed to the pressing-members, power-operated means for effecting a cycle of operation of said members to move them radially in relation to the form and simultaneously to press fabric upon the form and, then after the pressing-member has been returned to starting position and beads have been positioned on opposite sides of the form and additional fabric has been stretched thereover to overlie the beads, effecting a second movement of the members along the surface of that fabric, such pressing movement of the members being continuous and under the action of the power-operated means along the sides of the form and entirely over the beads.

28. A tire-making machine including a support, a fabric-pressing member on the support, a tire-form juxtaposed to the pressing-member, power-operated means for effecting a cycle of operation of said member to move it radially in relation to the form and to press fabric upon the form and, then, after the pressing-member has been returned to starting position and a bead has been positioned on the form and additional fabric has been stretched thereover to overlie the bead, effecting a second movement of the member along the surface of that fabric, such pressing movement of the member being continuous and under the action of the power-operated means along the sides of the form and entirely over the bead, said power-operated means including fluid-pressure operated means for maintaining said pressing-member resiliently against the fabric.

29. A tire-making machine including a support, a set of fabric-pressing members on the support, a tire-form juxtaposed to the pressing-members, power-operated means for effecting a cycle of operation of said members radially in relation to the form simultaneously to press fabric upon the form and, then, after the pressing-member has been returned to starting position and beads have been positioned on opposite sides of the form and additional fabric has been stretched thereover to overlie the beads, effecting a second movement of the members along the surface of that fabric, such pressing movement of the members being continuous and under the action of the power-operated means along the sides of the form and entirely over the beads, said power-operated means including fluid-pressure operated means for maintaining said pressing-members resiliently against the fabric.

30. A tire-making machine including a support, a tire-form mounted thereon, fabric-manipulating device juxtaposed to said tire-form, and movable both radially and angularly with respect thereto and means operated by fluid-pressure for independently actuating each of said manipulating devices in relation to the tire-form.

31. A tire-making machine including a support, a tire-form mounted thereon, fabric-manipulating devices juxtaposed to said tire-form, and movable both radially and angularly with respect thereto and means operated by fluid-pressure for independently actuating said manipulating devices radially toward and in relation to the tire-form.

32. A tire-making machine including a support, a tire-form thereon, a plurality of spaced fabric-manipulating instrumentalities juxtaposed to said tire-form, and movable both radially and angularly with respect thereto and pneumatically-operated means for positioning each of said manipulating instrumentalities independently in relation to the form.

33. The combination of a support, a rotatable tire-form, a carriage movable radially in relation thereto, a fabric-roller carried by the carriage and bodily movable thereon, both radially and angularly in relation to the form and means operated by air-pressure for pressing said roller radially toward said form.

34. The combination of a support, a rotatable tire-form, a movable carriage, a fabric-roller carried by the carriage and bodily movable thereon, a spring tending to move said roller in a direction away from said form, and means operated by air-pressure for pressing said roller toward said form.

35. The combination of a support, a rotatable tire-form, a movable carriage, a pneumatic cylinder carried by said carriage, a piston within said cylinder and movable toward and from said form, and a fabric-roller carried by said piston.

36. The combination of a support, a rotatable tire-form, a movable carriage, a pneumatic cylinder carried by said carriage, a piston within said cylinder and movable by air-pressure within the cylinder toward said form, a spring tending to move said piston in a direction away from said form, and a fabric-roller carried by said piston.

37. The combination of a support, a rotatable tire-form, a movable carriage, a fabric-roller carried by the carriage and bodily movable thereon, means operated by air-pressure for pressing said roller toward said form, and means for automatically releasing the air-pressure from said means when said carriage is moved to a predetermined position.

38. The combination of a support, a rotatable tire-form, a movable carriage, a fabric-roller carried by the carriage and bodily movable thereon, means operated by air-pressure for pressing said roller toward said form, and means for automatically controlling the air-pressure when said carriage is moved to a predetermined position.

39. The combination of a support, a rotatable tire-form, a movable carriage, a fabric-roller carried by the carriage and bodily movable thereon, mechanism for moving said carriage, means operated by air-pressure for pressing said roller toward said form, and means for automatically releasing the air-pressure from said means when said carriage is moved to a predetermined position.

40. The combination of a support, a rotatable tire-form, a movable carriage, a fabric-roller carried by the carriage and bodily movable thereon, an actuating mechanism provided with means to rotate said form and provided with means to move said carriage during the rotation of said form and provided with means to automatically stop the actuation of said carriage when it reaches a predetermined position. means operated by air-pressure for pressing said roller toward said form, and means for automatically releasing the air-pressure from the last-named means when said carriage reaches a predetermined position.

41. In a tire-making machine, a tire-form, a movable supporting structure juxtaposed to said tire-form, power-operated means for effecting an advancing movement of said supporting structure in relation to the tire-form, a pressing-member associated with the supporting-structure, and fluid-pressure-operated means positionable by said supporting structure for effecting engagement of the pressing-member with fabric on the tire-form, maintaining it yieldingly but with a constant and predetermined pressure against the fabric, and for manipulating the same thereon.

42. A tire-making machine including a support, a pressing-member positioning-structure thereon, a tire-form structure mounted adjacent the support, means for changing the relation between said structures whereby advancing and receding movements of one of the structures radially in relation to the other are positively effected, a fluid-pressure-operated fabric-pressing instrumentality carried and positionable by one of the structures in definite relation to the other. and fluid-pressure operated mechanism active on the instrumentality for maintaining it yieldingly but with a predetermined pressure in contact with the form during predetermined stages of operation of the positioning-structure.

43. In a tire-making machine, a supporting structure, a tire-form mounted thereon, a carriage arranged in juxtaposition to said form, means for effecting movement of said carriage in relation to said form, fabric-manipulating devices positionable by said carriage, and fluid-pressure operated means for operating said fabric-manipulating devices in relation to said form and for maintaining them in yielding and under a predetermined pressure against the form during predetermined stages of action of the carriage.

44. A tire-making machine including a supporting structure, a tire-form juxtaposed thereto, driving mechanism for rotating said tire-form, a carriage juxtaposed to said tire-form, means connecting with said driving mechanism and adapted to traverse said carriage in relation to said tire-form, fabric-manipulating devices positionable with said carriage, and fluid-pressure-operated mechanism connecting with said manipulating devices and adapted automatically to actuate the same in relation to the tire-form and to maintain the devices constantly against the form and with a definite and predetermined pressure thereon during predetermined stages of travel of the carriage.

45. A tire-making machine including a supporting structure, a tire-form juxtaposed thereto, a carriage mounted on the supporting structure. automatic carriage-driving mechanism for effecting movement of the carriage in relation to the tire-form, a pair of fabric-manipulating devices mounted in spaced relation on the carriage and positionable thereby in relation to the tire-form, and fluid-pressure-operated mechanism for automatically actuating said manipulating devices in relation to the tire-form.

46. A tire-making machine including a supporting structure, main driving mechanism sustained thereby, a rotatable tire-form sustained by the structure, a low-speed drive actuated by said driving mechanism for rotating said tire-form while fabric is being stretched thereon, a high-speed drive also actuated by said driving mechanism, a carriage movably mounted upon the structure, means for automatically effecting an advancing movement of said carriage in relation to the form when the same is rotated at high speed, a fabric-manipulating device positionable by the carriage, and fluid-pressure-operated means for automatically actuating said device in relation to the tire-form to maintain it in yielding but constant engagement with the form and under a definite and predetermined pressure thereagainst during predetermined stages of travel of the carriage.

47. A tire-making machine including a tire-form mechanism adapted to pass radially across the tire-form, automatic means for maintaining said mechanism in contact with the form, automatic means for disengaging said mechanism from the form, and power-actuated means for positioning said mechanism away from the form.

48. A tire-making machine including a rotatable tire-form for laying up tire material, mechanism adapted to pass radially across the tire-form for forming the material thereon, automatic means for maintaining said mechanism in contact with the form, automatic means for disengaging the mechanism from the form, and power-actuated means for positioning said mechanism away from the form.

49. A tire-making machine including a tire-form, a carriage movable in relation to the form, automatic means for effecting a traveling movement of the carriage in respect to the form, a fabric-pressing device associated with the carriage and positionable thereby in relation to the form, automatic means for effecting a traversing movement of the device along the surface of the form, automatic means for disengaging the device from the form at a predetermined stage in the travel of the carriage, and automatic means for positioning the device away from the form.

50. A tire-making machine including a tire-form, means for supplying tire-material thereto, variable speed mechanism for rotating said form, mechanism adapted to pass radially across the tire-form for forming the material thereon, automatic means for maintaining said mechanism in contact with the form, automatic means for interrupting the engagement of said mechanism with the form, and power-actuated means for positioning said mechanism away from the form.

51. A tire-making machine including a carriage, a presser-device associated therewith and movable thereby, automatic means for projecting said device in one direction, means for arresting its projection at a predetermined stage in the travel of the carriage, and automatic means for restoring the device to a starting position.

52. A tire-making machine including a presser-supporting carriage, a presser-device carried thereby and movable therewith, automatic means for effecting movement of the carriage, automatic means for effecting movement of the device in one direction and independently of the carriage, and automatic means for effecting retraction of the device.

53. A tire-making machine including a presser-supporting carriage, a presser-device carried thereby and movable therewith, automatic means for effecting movement of the carriage, automatic means for effecting movement of the device in one direction and independently of the carriage, automatic means for varying the angularity of the device, and automatic means for effecting retraction of the device.

54. A tire-making machine including a movable support, fabric-manipulating devices thereon, power-operated means for moving said manipulating devices in one direction, power-operated means for automatically effecting movement of the support, automatic means for arresting movement of the manipulating device, and power-operated means for restoring said devices to normal position.

55. A tire-making machine including a tire-form, a carriage movable in relation thereto, fabric-manipulating devices sustained by the carriage and positionable thereby in relation to the tire-form, power-operated means for actuating said devices in relation to the tire-form independently of the movement of the carriage, and power-operated means for returning said devices to normal position.

56. A tire-making machine including a tire-form, a support movable in relation thereto, power-operated means for moving said support, fabric-manipulating devices carried by the support and positionable thereby in relation to the tire-form, power-operated means for moving said devices toward the tire-form independently of the positioning movement of the support, and power-operated means for returning said devices to normal position.

57. A tire-making machine including a tire-form, a support movable in relation thereto, power-operated means for moving said support, fabric-manipulating devices carried by the support and positionable thereby in relation to the tire-form, power-operated means for moving said devices toward the tire-form independently of the positioning movement of the support, power-operated means for returning said devices to normal position, and means for returning the carriage to normal position.

58. A tire-making machine including a support, a tire-form, a carriage movable on the support in relation to the tire-form, power-operated means for moving said carriage, fabric-manipulating devices sustained by and positionable by the carriage, power-operated means for positioning said manipulating devices in relation to the tire-form independently of the positioning movement of the carriage, means for returning the carriage to normal position, and power-operated means for returning the manipulating devices to normal position in predetermined relation to the movement of the carriage.

59. A tire-making machine including a support, a tire-form, a carriage movable on the support in relation to the tire-form, power-operated means for moving said carriage, fabric-manipulating devices sustained by and positionable by the carriage, power-operated means for positioning said manipulating devices in relation to the tire-form independent of the positioning movement of the carriage, means for returning the carriage to normal position, and power-operated means for returning the manipulating devices to normal position in predetermined relation to the movement of the carriage but independent of such movement of the carriage.

60. A tire-making machine comprising a tire-form, means for rotating said form, means for pressing tire material upon the form including pressing-members adapted to be engaged with and rotated by the tire-form and normally disengaged therefrom, power-operated means for advancing said members into engagement with the form, a carriage for sustaining said pressing-member, power-operated means for effecting an advancing movement of the carriage, and power-operated means for effecting a receding movement of said members away from the form.

61. A tire-making machine including a tire-form, mechanism for rotating said form at low speed, mechanism for rotating said form at high speed, driving means for said low and high speed mechanisms, a carriage juxtaposed to said form, actuating means for said carriage to effect an advancing movement thereof in relation to the tire-form, means for connecting said carriage-actuating mechanism to said driving means when said high speed mechanism is operating, pressing-members carried by and movable with said carriage for positioning them in relation to the tire-form, power-operated means for effecting a radial movement of said pressing-members in relation to said tire-form independently of their positioning by the carriage, and power-operated means for effecting a receding movement of said members away from the form.

62. In a tire-making machine, a support, fabric-pressing members carried by the support, fluid-pressure-operated means for actuating said pressing-members, with a constant and predetermined pressure and independent means for changing the angular relation of said members relatively to each other.

63. In a tire-making machine, a support, a pair of spaced fabric-pressing members carried by the support, fluid-pressure-operated means for actuating said pressing-members, with a constant and predetermined pressure and independent means for changing the angular relation of said pressure-operated members relatively to each other.

64. A tire-making machine including a support, carriers movably sustained thereby, fabric-manipulating devices rotatably mounted on said carriers, automatic means for actuating said carriers whereby said manipulating devices are shifted horizontally, and automatic means for effecting a rotative movement of each carrier.

65. A tire-making machine including a support, carriers movably sustained thereby, fabric-manipulating devices rotatably mounted on said carriers, and means for automatically actuating said carriers whereby said manipulating devices are automatically shifted bodily and simultaneously rotated on an axis approximately perpendicular to the plane of the shifting movement thereof.

66. A tire-making machine including a supporting structure, a fabric-manipulating device sustained thereby and having a rotative movement, a sliding sustaining-element on which said device is mounted, and power-operated means for effecting sliding movement of said element and thereby automatically effecting the rotative movement of the manipulating device.

67. A tire-making machine including a supporting structure, means for effecting movement of the structure, a fabric-manipulating device sustained thereby and having a rotative movement, a sliding sustaining-element on which said device is mounted, and power-operated means for effecting sliding movement of said element, additional to but approximately in the direction of the movement of the structure for automatically effecting the rotative movement of the manipulating device.

68. A tire-making machine including a supporting structure, a fabric-manipulating device sustained thereby and including a fabric-pressing member, a sliding sustaining element on which said member is mounted, and power-operated means for effecting rotative movement of the member during the sliding movement of the element and in a plane perpendicular to that of such sliding movement.

69. A tire-making machine including a supporting structure, a fabric-manipulating device sustained thereby and including a rotatable pressing-member, an element in which said pressing-member is slidably mounted, fluid-pressure-operated means for effecting a sliding movement of said member in its element, and independent means for positioning said element.

70. In a tire-making machine, a support, a bracket mounted thereon, a rotatable tire-form operatively associated with the support, a pressing-member slidably mounted on the bracket, and movable in relation to different portions of the surface of said form, a fluid-pressure-operated device carried by the bracket and adapted to project said pressing-member toward and against the form with a constant and predetermined pressure and including a cylinder, a piston therein, and means for introducing fluid under pressure into said cylinder.

71. In a tire-making machine, a support, a bracket mounted thereon, a rotatable tire-form operatively associated with the support, a pressing-member slidably mounted on the bracket, and movable in relation to different portions of the surface of said form, a fluid-pressure-operated device carried by the bracket and adapted to project said pressing-member toward and against the form with a constant and predetermined pressure and including a cylinder, a piston therein, means for introducing fluid under pressure into said cylinder, and means for controlling the introduction and escape of said fluid from said cylinder.

72. In a tire-making machine, a support, a bracket mounted thereon, a rotatable tire-form operatively associated with the support, a pressing-member slidably mounted on the bracket, and movable in relation to different portions of the surface of said form, a fluid-pressure-operated device carried by the bracket and adapted to project said pressing-member toward and against the form with a constant and predetermined pressure and including a cylinder, a piston therein, means for introducing fluid under pressure into said cylinder, and automatic means for controlling the introduction and escape of said fluid from said cylinder.

73. In a tire-making machine, a support, a bracket mounted thereon, a rotatable tire-form operatively associated with the support, a pressing-member slidably mounted on the bracket, and movable in relation to different portions of the surface of said form, a fluid-pressure-operated device carried by the bracket and adapted to project said pressing-member toward and against the form with a constant and predetermined pressure and including a cylinder, a piston therein, means for introducing fluid under pressure into said cylinder, means for controlling the introduction and escape of said fluid from said cylinder, and means for effecting a receding movement of said pressing-member after the pressure-fluid has escaped from said cylinder.

74. In a tire-making machine, a support, a cross-head slidably mounted thereon, a bracket carried by the cross-head and having a rotative movement therein, means for effecting such rotative movement of the bracket, a pressing-member movably mounted on said bracket, and a pneumatic device mounted on the bracket and adapted to actuate said pressing-member.

75. In a tire-making machine, a support, a cross-head slidably mounted thereon, a bracket carried by the cross-head and having a rotative movement therein, means for effecting such rotative movement of the bracket, a pressing-member movably mounted on said bracket, a pneumatic device mounted on the bracket and adapted to actuate said pressing-member, and means for returning the pressing-member to normal position after acting under the influence of said pneumatic device.

76. In a tire-making machine, a support, a cross-head slidably mounted thereon, a bracket carried by the cross-head and having a rotative movement therein, means for effecting such rotative movement of the bracket, a pressing-member movably mounted on said bracket, a pneumatic device mounted on the bracket and adapted to actuate said pressing-member, means for returning the pressing-member to normal position after acting under the influence of said pneumatic device, and a carriage by which said cross-head is sustained.

77. A tire-making machine including a support, a sustaining-member mounted thereon, a tire-manipulating device rotatable in said member, co-operating means carried by said member for effecting a rotative movement of its manipulating device on a vertical axis, and means for bodily moving the member whereby said manipulating device is bodily shifted and, by co-action of said co-operating means, rotated automatically on such vertical axis.

78. A tire-making machine including a support, spaced brackets mounted thereon, cross-heads slidably mounted on said brackets, tire-manipulating devices rotatable in said cross-heads, co-operating means carried by each cross-head and bracket for effecting a rotative movement of its manipulating device on a vertical axis, and means for bodily moving the cross-head whereby said manipulating device is bodily shifted and, by co-action of said co-operating means, rotated automatically on such vertical axis.

79. A tire-making machine including a support, bracket-members mounted thereon, presser-sustaining cross-heads slidably disposed on the bracket-members, fabric-pressers rotatably mounted in said heads and having a rack-and-pinion engagement with said bracket-members whereby each presser may be rotated on an approximately vertical axis, a rock-shaft journaled in the bracket-members and actuatable to control the relative angular position of the presser-members, and operating connections between said shaft and the cross-heads.

80. A tire-making machine including a support, transversely shiftable bracket-members mounted thereon, presser-sustaining cross-heads slidably disposed on the bracket-members, fabric-pressers rotatably mounted in said heads and having a rack-and-pinion engagement with said bracket-members whereby each presser may be rotated on an approximately vertical axis, a rock-shaft journaled in the bracket-members and actuatable to control the relative angular position of the presser-members, and operating connections between said shaft and the cross-heads.

81. A tire-making machine including a support, a fabric-pressing member on the support, a tire-form juxtaposed to the pressing-member, power-operated means for positioning said member in various relations to the form, and power-operated means for effecting movement of the member in relation to the form distinct from its positioning motion.

82. A tire-making machine including a support, a fabric-pressing member on the support, a movable tire-form juxtaposed to the pressing-member, means for actuating said form, power-operated means for positioning said member in various relations to the form, and power-operated means for effecting movement of the member in relation to the form distinct from its positioning motion.

83. The combination of a support, a rotatable tire-form, a fabric-roller adjacent to the form, means for pressing said roller yieldingly toward said form, and power-operated means operative to change the angle of the roller relatively to the form.

84. The combination of a support, a rotatable tire-form, a movable carriage, a fabric-roller carried by the carriage, means for pressing said roller yieldingly toward said form, and means power-operated and operative to change the angle of the roller relatively to the form during the movement of the carriage.

85. A tire-making machine including a support, a fabric-pressing member on the support, a tire-form juxtaposed to the pressing-member, power-operated means for pressing said member toward and resiliently maintaining the same in contact with the form, and power-operated means for shifting the position of the member on its support in relation to the form, such motion being distinct from that of its pressing movement.

86. A tire-making machine including a support, a fabric-pressing member on the support, a tire-form juxtaposed to the pressing-member, power-operated means for pressing said member toward and resiliently maintaining the same in contact with the form along the surface of the form and over and around a bead disposable thereon, and power-operated means for shifting the position of the member on its support in relation to the form and to different portions of the bead, such motion being distinct from that of its pressing movement.

87. A tire-making machine including a support, a tire-form arranged in juxtaposition to the support, pressing-members movable in relation to the tire-form, power-operated means for moving said pressing-members into and maintaining them in contacting relation with the tire-form, and power-operated means for changing the degree of angularity of the pressing-members with reference to the surface of the tire-form.

88. A tire-making machine including a support, a fabric-covered tire-form arranged in juxtaposition to the support, pressing-members movable in relation to the tire-form, power-operated means for moving said pressing-members into and maintaining them in contacting relation with the tire-form, and power-operated means for changing the degree of angularity of the pressing-members with reference to the surface of the tire-form.

89. The combination of a support, a rotatable tire-form, a movable carriage, a fabric-pressing member carried by the carriage and bodily shiftable thereon, power-driven means operative to move the carriage relatively to the form, and means deriving actuation from said power-driven means for moving said pressing-member on a vertical axis relatively to said form during the movement of the carriage.

90. The combination of a support, a rotatable tire-form, a carriage movable in relation to the form, a fabric-pressing member supported on a vertical axis on said carriage, actuating mechanism including means for rotating said form, and means for automatically moving said carriage during the rotation of said form and thereby effecting a rotative movement of the pressing-member on its vertical axis.

91. The combination of a support, a rotatable tire-form, a carriage movable in relation to the form, a fabric-pressing member supported on a vertical axis on said carriage, actuating-mechanism including means for rotating said form, means for automatically moving said carriage during the rotation of said form, means deriving action by the movement of the carriage for effecting a rotative movement of the pressing-member on a vertical axis, and independent means for moving said pressing-member independently of the movement of the carriage.

92. The combination of a support, a rotatable tire-form, a carriage movable in relation to the form, a fabric-roller supported on a vertical axis on the carriage and bodily shiftable thereon, actuating mechanism including means to rotate said form on its vertical axis, means for automatically moving said carriage during the rotation of the form and during the rotative movement of the roller on its vertical axis, and means for bodily shifting said roller relatively to the form during the movement of the carriage.

93. A tire-making machine including a support, a tire-form sustained thereby, oscillating members mounted on the support, fabric-manipulating devices mounted on and positionable by said oscillating members, and power-operated means for actuating said oscillating members whereby said manipulating devices are moved along the surface of said tire-form and also rotated about their axes in said oscillating members.

94. A tire-making machine including a support, a tire-form sustained thereby, sliding members mounted on the support, fabric-manipulating devices mounted on and positionable by said sliding members, and power-operated means for automatically effecting movement of the sliding members on the support whereby said manipulating devices are moved along the surface of said tire-form and also rotated about their axes in said slidable members.

95. A tire-making machine including a support, a tire-form sustained thereby, oscillating members mounted on the support, fabric-manipulating devices mounted on and positionable by said oscillating members, member-rotating instrumentalities for changing the position of said devices, means for actuating said oscillating members in relation to said member-rotating instrumentalities whereby said manipulating devices are moved along the surface of said tire-form and also rotated about their axes in said oscillating members, and means for yieldingly maintaining the manipulating devices in contact with the tire-form.

96. A tire-making machine including a support, a tire-form sustained thereby, oscillating members mounted on the support, fabric-manipulating devices mounted on and positionable by said oscillating members, means for actuating said oscillating members whereby said manipulating devices are moved along the surface of said tire-form and also rotated about their axes in said oscillating members, and fluid-pressure-operated mechanism for yieldingly maintaining the manipulating devices in contact with the tire-form.

97. A tire-making machine including a support, a tire-form sustained thereby, sliding members movably mounted on the support, fabric-manipulating devices mounted on and positionable by said sliding members, means for actuating said sliding members whereby said manipulating devices are moved along the surface of said tire-form and also rotated about their axes in said slidable members, and fluid-pressure mechanism operating to project the fabric-manipulating devices toward the tire-form and resiliently maintaining the same in contact therewith while they are being moved along its surface.

98. A tire-making machine including a support, a tire-form sustained thereby, sliding members movably mounted on the support, fabric-manipulating devices mounted on and positionable by said slding members, means for actuating said sliding members whereby said manipulating devices are moved along the surface of said tire-form and also rotated about their axes in said slidable members, means for yieldingly maintaining the manipulating devices in contact with the tire-form, and means for changing the transverse relation between said slidable members for operating upon different widths of tires.

99. The combination of a support, a rotatable tire-form, a movable bracket-sustaining carriage, a bracket pivoted on the carriage, a fabric-roller carried by the bracket, an actuating mechanism provided with means to rotate said form and provided with means to automatically move said carriage during the rotation of said form, and mechanism operative to turn said bracket on its pivot by, and during the movement of, the carriage.

100. The combination of a support, a rotatable tire-form, a movable carriage, having a to-and-fro movement in respect to the form, a bracket-sustaining carriage on the movable carriage, a fabric-roller carried by the bracket-sustaining carriage, means for pressing said rloler yieldingly but with a constant and predetermined pressure against said form, and an actuating mechanism provided with means to rotate said form and provided with means to automatically move said movable carriage and also the sustaining-carriage during the rotation of said form, movement of the sustaining carriage being distinct from that of the movable carriage.

101. A tire-making machine including a supporting structure, a tire-form supporting-device sustained thereby, a fabric-manipulating device also sustained thereby and in juxtaposition to the tire-form supporting-device and including a rotatable member, a bracket in which said member is slidably mounted, fluid-pressure-operated means for actuating said member in its bracket in one direction and against the form with a constant and predetermined pressure, and means for actuating said member in the opposite direction.

102. A tire-making machine including a supporting structure, a tire-form sustained thereby, and a fabric-manipulating device juxtaposed to the tire-form and including a rotatable fabric-pressing member, a bracket in which said member is slidably supported, fluid-pressure-operated means for projecting said member toward the tire-form, independent means for effecting a receding movement of said member away from the form, and means for changing the position of said bracket in relation to the form.

103. A tire-making machine including a support, a tire-form, element-sustaining members mounted on the suppoort in juxtaposition to the form, presser-sustaining elements on said members, presser-devices carried by said elements and engagingly related to the form, means for rotating said presser-devices, and means for automatically actuating said presser-sustaining elements in relation to the element-sustaining members whereby the presser-devices are given an angular positioning movement in relation to the form simultaneously with their rotative movement.

104. A tire-making machine including a support, a tire-form, transversely-spaced element-sustaining members mounted on the support in juxtaposition to the form, slidable presser-sustaining elements on said members, presser-devices carried by said elements and engagingly related to the form, means for rotating said presser-devices, and means for automatically actuating said presser-sustaining elements in relation to the element-sustaining members whereby the presser-devices are given an angular positioning movement in relation to the form simultaneously with their rotative movement.

105. A tire-making machine including a support, a tire-form, element-sustaining members mounted on the support in juxtaposition to the form, presser-sustaining elements on said members, presser-devices carried by said elements and engagingly related to the tire-form, means for rotating said presser-devices, means for automatically actuating said presser-sustaining elements in relation to the element-sustaining members whereby the presser-devices are given an angular positioning movement in relation to the form simultaneously with their rotative movement, and means for varying the movement of said sustaining elements whereby the degree of relative angularity of the presser-devices may be varied.

106. A tire-making machine including a support, a tire-form, transversely-spaced element-sustaining members mounted on the support in juxtaposition to the form, slidable presser-sustaining elements on said members, presser-devices carried by said elements and engagingly related to the tire-form, means for rotating said presser-devices, means for automatically actuating said presser-sustaining elements in relation to the element-sustaining members whereby the presser-devices are given an angular positioning movement in relation to the form simultaneously with their rotative movement, and means for varying the movement of said sustaining-elements whereby the degree of relative angularity of the presser-devices may be varied.

107. A tire-making machine including a support, a tire-form, element-sustaining members mounted on the support in juxtaposition to the form, presser-sustaining elements on said members, presser-devices carried by said elements and engagingly related to the tire-form, means for rotating said presser-devices, means for automatically actuating said presser-sustaining elements whereby the presser-devices are automatically given an angular positioning movement in relation to the form simultaneously with their rotative movement, and means for varying at the will of the operator the movement of said sustaining elements whereby the degree of relative angularity of the presser-devices may be varied.

108. A tire-making machine including a support, a tire-form, element-sustaining members mounted on the support in juxtaposition to the form, presser-sustaining elements on said members, presser-devices carried by said elements and engagingly related to the form, means for rotating said presser-devices, and power-operated means for actuating said presser-sustaining elements in relation to the element-sustaining members whereby the presser-devices are automatically given an angular positioning movement in relation to the form simultaneously with their rotative movement.

109. A tire-making machine including a support, a tire-form, transversely-spaced element-sustaining members mounted on the support in juxtaposition to the form, slidable presser-sustaining elements on said members, presser-devices carried by said elements and engagingly related to the form, means for rotating said presser-devices, and power-operated means for actuating said presser-sustaining elements in relation to the element-sustaining members whereby the presser-devices are given an angular positioning movement in relation to the form simultaneously with their rotative movement.

110. A tire-making machine including a support, a tire-form, element-sustaining members mounted on the support in juxtaposition to the form, presser-sustaining elements on said members, presser-devices carried by said elements and engagingly related to the form, means for rotating said presser-devices, fluid-pressure-operated means for actuating said presser-devices, and means for actuating said presser-sustaining elements whereby the presser-devices are given an angular positioning movement in relation to the form simultaneously with their rotative movement.

111. A tire-making machine including a support, a tire-form, element-sustaining members mounted on the support in juxtaposition to the form, presser-sustaining elements on said members, presser-devices carried by said elements and engagingly related to the form, co-acting means on said members and elements for rotating said presser-devices, and power-operated means for actuating said presser-sustaining elements in relation to the element-sustaining members whereby the presser-devices are automati- 112. A tire-making machine including a support, a tire-form sustained thereby, spaced brackets mounted on the support, slidable cross-heads sustained by the brackets, fabric-manipulating devices carried and positionable by said cross-heads, and means for moving said cross-heads whereby said devices are moved along the surface of said tire-form and also rotated on their axes in said cross-heads.

113. A tire-making machine including a tire-form, power-operated mechanism for pressing tire-material on the form comprising instrumentalities having an advancing radial movement with respect to the form and automatically variable at different stages of such movement, forming-elements carried by said instrumentalities and engageable with the form at an angle to the plane thereof, and automatically actuatable means for varying such angle of engagement.

114. A tire-making machine including a tire-form, power-operated mechanism for pressing tire-material on the form comprising the instrumentalities having an advancing radial movement with respect to the form and variable at different stages of such movement, forming-elements carried by said instrumentalities and engageable with the form at an angle to the plane thereof, means for varying such angle of engagement, and power-operated means for effecting a receding movement of said forming elements away from the form.

115. A tire-making machine including a tire-form for receiving tire material, power-operated mechanism for pressing the tire-material on the form comprising instrumentalities having an advancing radial movement with respect to the form and variable at different stages of such movement, forming-elements carried by said instrumentalities and engageable with the form at an angle to the plane thereof, means for varying such angle of engagement, and power-operated means for effecting a receding movement of said forming elements away from the form.

116. A tire-making machine including a tire-form for receiving tire material, power-operated mechanism adapted to pass radially over the form for forming the material thereon, automatic means for maintaining said mechanism constantly but yieldingly against the form, means for varying the angularity of movement of said mechanism in relation to the form, and power-operated means for positioning said mechanism away therefrom.

117. A tire-making machine including a tire-form for receiving tire material, power-operated mechanism for forming the material on the form comprising a plurality of pressing-members adapted to have an advancing radial movement with respect to the form and engageable therewith at an angle to the plane thereof, means for advancing said pressing-members toward the form and maintaining them thereagainst with a predetermined but yielding pressure, means for controlling and varying the angle of engagement of said members and operative while said members are in engagement with the form, and power-operated means for effecting a receding movement of said members away from the form.

118. A tire-making machine including a tire-form for receiving tire material, power-operated mechanism for forming the material on the form comprising a plurality of pressing-members adapted to have an advancing radial movement with respect to the form and engageable therewith at an angle to the plane thereof, means for advancing said pressing-members toward the form and maintaining them thereagainst with a predetermined but yielding pressure, and means independent of the form for controlling and varying the angle of engagement of said members and operative while said members are in engagement with the form.

119. A tire-making machine including a tire-form for receiving tire material, mechanism for forming tire-material on the form comprising a plurality of pressing-members adapted to have an advancing radial movement with respect to the form and engageable therewith, a carriage for sustaining the pressing-members, means for moving the carriage in respect to the form, automatic means for advancing said pressing-members toward the form and maintaing them thereagainst, power-operated means for effecting a receding movement of said members away from the form, and means for returning said members to normal position after completing their receding movement.

120. A tire-making machine including a tire-form, power-operated mechanism for forming tire-material on the form comprising a plurality of pressing-members adapted to have an advancing radial movement with respect to the form and engageable therewith at an angle to the plane thereof, means for advancing said pressing-members toward the form and maintaining them thereagainst with a predetermined but yielding pressure, means for controlling and varying the angle of engagement of said members and operative while said members are in engagement with the form, power-operated means for effecting a receding movement of said members away from the form, and means for returning said members to normal position after completing their receding movement.

121. A tire-making machine including a tire-form for receiving tire material, power-operated mechanism for forming the tire-material on the form comprising a plurality of pressing-members adapted to have an advancing radial movement with respect to the form and engageable therewith at an angle to the plane thereof, means for advancing said pressing-members toward the form and maintaining them thereagainst with a predetermined but yielding pressure, means for controlling and varying the angle of engagement of said members and operative while said members are in engagement with the form, power-operated means for effecting a receding movement of said members away from the form, and means for returning said members to normal position after completing their receding movement.

122. The combination of a support, a rotatable tire-form, a gear-rack, a carriage movable relatively to said rack, a bracket having a pivot-stud mounted to turn in said carriage, a gear-wheel on said stud and meshing in said rack, and a fabric-roller carried by said bracket.

123. A tire-making machine including a tire-form, power-operated mechanism for pressing tire-material on the form and including instrumentalities having an advancing radial movement with respect to the form, means for effecting a variable movement of said instrumentalities at different stages of their movement, and forming elements carried by said instrumentalities and engageable with the form and having a movement radially in relation thereto, such movement being variable at different stages and related to the variable movement of said instrumentalities, whereby the predetermined angular engagement of the elements with the form may be maintained.

124. A tire-making machine including a tire-form, power-operated mechanism for pressing tire-material on the form and including instrumentalities having an advancing radial movement with respect to the form and variable at different stages of such movement, forming elements carried by said instrumentalities and engageable with the form and having a movement radially in relation thereto, means for effecting a variable movement of the forming elements at different stages of their action, and means for actuating said forming elements in relation to the tire-form independent of their movement with said instrumentalities.

125. A tire-making machine including a tire-form, power-operated mechanism for pressing tire-material on the form and including instrumentalities having an advancing radial movement with respect to the form and variable at different stages of such movement, forming elements carried by said instrumentalities and engageable with the form and having a travel radially relative to the form, means for effecting movement of the elements variable at different stages of their radial travel and in respect to the varying contour of the form, and pressure-operated means for actuating said forming elements in relation to the tire-form independent of their movement with said instrumentalities.

126. A tire-making machine including a tire-form, power-operated mechanism for pressing tire-material on the form and including instrumentalities having an advancing radial movement with respect to the form, means for effecting an accelerated movement of said instrumentalities during their radial movement, forming elements carried by said instrumentalities and engageable with the form and having a movement radially in relation thereto, and means for effecting a variable movement of the forming elements at different stages of their radial movement and in relation to the variable movement of said instrumentalities.

127. A tire-making machine including a tire-form, power-operated mechanism for pressing tire-material on the form comprising instrumentalities having an advancing radial movement with respect to the form and variable at different stages of such movement, forming-elements carried by said instrumentalities and engageable with the form and having a movement radially in relation thereto, such movement being variable at different stages and related to the variable movement of said instrumentalities, and means for varying the angle of engagement of said forming-elements with respect to the form.

128. A tire-making machine including a tire-form, power-operated mechanism for pressing tire-material on the form and including instrumentalities having an advancing radial movement with respect to the form and variable at different stages of such movement, forming-elements carried by said instrumentalities and engageable with the form and having a movement radially in relation thereto, such movement being variable at different stages and related to the variable movement of said instrumentalities, means for effecting an accelerated action of the forming element, and means for varying the angle of engagement of said forming-elements with respect to the form at the time that each forming element is having an accelerated action during its variable movement.

129. A tire-making machine including a tire-form, a supporting structure, power-operated mechanism for effecting an advancing radial movement of said supporting structure in relation to the form, power-operated mechanism for pressing tire-material on the form comprising instrumentalities sustained by said supporting structure and having an advancing radial movement with respect to the form and to the supporting structure and variable at different stages of such movement, forming-elements carried by said instrumentalities and movable radially in relation to the form, such movement being variable at different stages related to the variable movement of said instrumentalities, and means for varying the angle of engagement of said forming-elements with respect to the form.

130. A tire-making machine including a tire-form, power-operated mechanism for pressing tire-material upon the form comprising instrumentalities having a radial movement with respect to the tire-form, forming-elements sustained by said instrumentalities, means for effecting an advancing radial movement of said forming-elements in relation to the form, and means for varying the speed of such movement whereby, at one stage, the forming-elements will have a relatively slow movement, and, at another stage, a more accelerated movement.

131. A tire-making machine including a tire-form, power-operated mechanism for pressing tire-material upon the form comprising instrumentalities having a radial movement with respect to the tire-form, forming-elements sustained by said instrumentalities, means for effecting an advancing radial movement of said forming-elements in relation to the form, means for varying the speed of such movement whereby, at one stage, the forming-elements will have a relatively slow movement and, at another stage, a more accelerated movement, and means for changing the angle of engagement of said forming-elements with respect to the form.

132. A tire-making machine including a tire-form, power-operated mechanism for pressing tire-material upon the form comprising instrumentalities having a radial movement with respect to the tire-form, forming-elements sustained by said instrumentalities, means for effecting an advancing radial movement of said forming-elements in relation to the form, means for varying the speed of such movement whereby, at one stage, the forming-elements will have a relatively slow movement and, at another stage, a more accelerated movement, and means for changing the angle of engagement of said forming-elements with respect to the form and in predetermined relation to an accelerated radial movement of the forming-elements.

133. The combination of a support, a rotatable tire-form, a movable carriage, a fabric-roller carried by the carriage, means for pressing said roller toward said form, and means operated by said carriage during the movement thereof to change the angle of said roller relatively to said form.

134. The combination of a support, a rotatable tire-form, a movable carriage, a bracket pivoted to a part on the carriage, a fabric-roller carried by the bracket, an actuating mechanism provided with means to rotate said form and provided with means to automatically move said carriage during the rotation of said form, and means operated by said carriage during the movement thereof to turn said bracket on its pivot.

135. The combination of a support, a rotatable tire-form, a movable carriage, a second carriage carried by and movable on the first-named carriage, means for moving the first-named carriage, a fabric-roller carried by said second carriage, means operated by one of said carriages during the movement thereof to change the angle of said roller relatively to said form, and means operated by the first-named carriage during the movement thereof to move said second carriage relatively to the first-named carriage.

136. In a tire-making machine, a support, a carriage movably mounted thereon, presser-sustaining elements slidably disposed on the carriage, means actuated by the movement of said carriage for shifting said sustaining-elements, pressing-members rotating on vertical axes in said elements, means for effecting rotative movement of said pressing-members during the sliding movement of said elements, and pneumatic devices connected to said pressing-members for projecting them.

137. In a tire-making machine, a support, a carriage movably mounted thereon, cross-heads slidably disposed on the carriage, means actuated by the movement of said carriage for shifting said cross-heads, pressing-members rotating on vertical axes in said cross-heads, means for effecting rotative movement of said pressing-members during the sliding movement of said cross-heads, pneumatic devices connected to said pressing-members for projecting them in one direction, and means also connected to said pressing-members for returning them to normal position.

138. A tire-making machine including in combination, a support, a carriage-supporting bracket thereon, a carriage mounted on said bracket and including spaced trunnion-members, means for changing the relative distance between said trunnion-members, slidable cross-heads juxtaposed to the trunnion-members, means carried by the carriage and deriving motion therefrom to actuate said slidable cross-heads, pressing-members carried by said cross-heads, means operative during the movement of said cross-heads to swing each of said pressing-members on a vertical axis and thereby to change the degree of angularity of the pressing-members with reference to the tire-form, and independent means for actuating said pressing-members toward the tire-form independently of the cross-heads.

139. The combination of a support, a rotatable tire-form, a movable carriage, means for moving the carriage, a gear-rack carried by said carriage, a second carriage carried by and movable on the first-named carriage, a bracket having a pivot-stud mounted to turn in said second carriage, a gear-wheel on said stud and meshing in said rack, means operative to move said second carriage relatively to the first-named carriage, and a fabric-roller carried by a part on said bracket.

140. The combination of a support, a rotatable tire-form, a movable carriage, means for moving the carriage, a gear-rack carried by said carriage, a second carriage carried by and movable on the first-named carriage, a bracket having a pivot-stud mounted to turn in said second-carriage, a gear-wheel on said stud and meshing in said rack, a fabric-roller carried by a part on said bracket, a rock-shaft carried by the first-named carriage, and an arm projecting from said rock-shaft and connected to said second carriage.

141. The combination of a support, a rotatable tire-form, a movable carriage, means for moving the carriage, a gear-rack carried by said carriage, a second carriage carried by and movable on the first-named carriage, a bracket having a pivot-stud mounted to turn in said second carriage, a gear-wheel on said stud and meshing in said rack, a fabric-roller carried by a part on said bracket, a rock-shaft carried by the first-named carriage, an arm projecting from said rock-shaft and connected to said second carriage, a fixed cam, and an arm projecting from said shaft and co-operating with said cam to turn said shaft during the movement of the first-named carriage.

142. The combination of a support, a rotatable tire-form, a movable carriage, a fabric-roller carried by the carriage and bodily movable thereon, means operative to move the carriage relatively to the form, a cam, and means operated by said cam during the movement of the carriage to move said roller relatively to the carriage.

143. The combination of a support, a rotatable tire-form, a movable carriage, a fabric-roller carried by the carriage and bodily movable thereon, means operative to move the carriage relatively to the form, an adjustable cam, means controlled by said cam for controlling movement of said roller during the movement of said carriage, and means operative to adjust said cam.

144. The combination of a support, a rotatable tire-form, a movable carriage, a second carriage carried by and movable on the first-named carriage, a fabric-pressing member sustained by one of said carriages, and means operating to prevent relative movement between said carriages during one portion of the movement of the first-named carriage and operating to cause relative movement between said carriages during another portion of the movement of the first-named carriage.

145. The combination of a support, a rotatable tire-form, a movable carriage, a second carriage carried by and movable on the first-named carriage, a fabric-pressing member sustained by one of said carriages, and means to give said second carriage an irregular movement upon the first-named carriage during the movement of the first-named carriage.

146. The combination of a support, a rotatable tire-form, a movable carriage, a fabric-roller carried by the carriage and bodily movable thereon, means operative to move the carriage relatively to the form, and means to move said roller relatively to the carriage during the movement of the latter, the last-named means including a cam-roller controlling movement of the fabric-roller, and a pivoted arm and a cam controlling movement of the cam-roller.

147. The combination of a support, a rotatable tire-form, a movable carriage, a fabric-roller carried by the carriage and bodily movable thereon, means operative to move the carriage relatively to the form, and means to move said roller relatively to the carriage during the movement of the latter, the last-named means including a cam-roller controlling movement of the fabric-roller, a pivoted arm and a cam controlling movement of the cam-roller, and means carried by the carriage for operating the pivoted arm.

148. In a tire-making machine, a support, a carriage movable thereon, brackets mounted on the carriage and movable therewith, cross-heads slidable on the brackets, a pivot-stud rotatably disposed in each cross-head, a rack formed on each bracket, a toothed wheel carried by the pivot-stud and engaging said rack, a pressing-member attached to the pivot-stud and rotatable therewith, a rock-shaft journaled in the bracket, arms fast on the shaft, connections between the cross-heads and said arms, and means for actuating said rock-shaft whereby said cross-heads are caused to have a sliding movement and said pressers are bodily shifted therewith and simultaneously rotated therein.

149. In a tire-making machine, a support, a carriage movable thereon, brackets mounted on the carriage and movable therewith, cross-heads slidable on the brackets, a rack formed on each bracket, a pivot-stud rotatably disposed in each cross-head, a toothed wheel carried by the pivot-stud and engaging said rack, a pressing-member attached to the pivot-stud and rotatable therewith, a rock-shaft journaled in the bracket, arms fast on the shaft, connections between the cross-heads and said arms, means for actuating said rock-shaft whereby said cross-heads are caused to have a sliding movement and said pressers are bodily shifted therewith and simultaneously rotated therein, and means for varying the extent of traveling movement of said rock-shaft wherby the degree of angular movement of the pressers may be varied.

150. In a tire-making machine, a support, a carriage movable thereon, brackets mounted on a carriage and movable therewith, cross-heads slidable on the brackets, a rack formed on each bracket, a pivot-stud rotatably disposed in each cross-head, a toothed wheel carried by the pivot-stud and engaging said rack, a pressing-member attached to the pivot-stud and rotatable therewith, a rock-shaft journaled in the bracket, arms fast on the shaft, connections between the cross-heads and said arms, means for actuating said rock-shaft whereby said cross-heads are caused to have a sliding movement and said pressers are bodily shifted therewith and simultaneously rotated therein, and means for varying the extent of traveling movement of said rock-shaft whereby the degree of angular movement of the pressers may be varied, said varying means including a block mounted in juxtaposition to said rock-shaft and provided with a cam-slot.

151. In a tire-making machine, a support, a carriage movable thereon, brackets mounted on the carriage and movable therewith, cross-heads slidable on the brackets, a rack formed on each bracket, a pivot-stud rotatably disposed in each cross-head, a toothed wheel carried by the pivot-stud and engaging said rack, a pressing-member attached to the pivot-stud and rotatable therewith, a rock-shaft journaled in the bracket, arms fast on the shaft, connections between the cross-heads and said arms, means for actuating said rock-shaft whereby said cross-heads are caused to have a sliding movement and said pressers are bodily shifted therewith and simultaneously rotated therein, and means for varying the extent of traveling movement of said rock-shaft whereby the degree of angular movement of the pressers may be varied, said varying means including a block mounted in juxtaposition to said rock-shaft and provided with a cam-slot, and an arm fast on the rock-shaft and carrying a roller traveling in said cam-slot.

152. In a tire-making machine, a support, a carriage movable thereon, brackets mounted on the carriage and movable therewith, cross-heads slidable on the brackets, a rack formed on each bracket, a pivot-stud rotatably disposed in each cross-head, a toothed wheel carried by the pivot-stud and engaging said rack, a pressing-member attached to the pivot-stud and rotatable therewith, a rock-shaft journaled in the bracket, arms fast on the shaft, connections between the cross-heads and said arms, and means for actuating said rock-shaft whereby said cross-heads are caused to have a sliding movement and said pressers to be bodily shifted therewith and simultaneously rotated therein, and means for varying the extent of traveling movement of said rock-shaft whereby the degree of angular movement of the pressers may be varied, said varying means including a block mounted in juxtaposition to said rock-shaft and provided with a cam-slot, an arm fast on the rock-shaft and carrying a roller traveling in said cam-slot, and means for shifting said cam-block.

153. The combination of a support, a rotatable tire-form, a movable carriage, a second carriage carried by and movable on the first-named carriage, means for moving the first-named carriage, a fabric-roller carried by said second carriage, and means operated by said second carriage during the movement thereof to change the angle of said roller relatively to said form.

154. A tire-making machine including a support, a carriage thereon, a tire-form juxtaposed to the carriage, a pair of fabric-pressing members sustained by and movable with the carriage, power-operated means for effecting movement of the carriage to position the pressing-members in proximity to the tire-form, means independent of the tire-form and rendered operative during the movement of the carriage automatically to effect an angular motion of the pressing members with relation to the tire-form, and means for actuating said pressing-members into contact with the tire-form and for resiliently maintaining them in such contact.

155. A tire-making machine including a support, a carriage thereon, a tire-form juxtaposed to the carriage, fabric-pressing members supported on the carriage, means for effecting a traveling movement of the carriage in relation to the tire-form, means for moving the pressing-members into a contacting position with relation to the tire-form, and means independent of the tire-form and operative during the movement of the carriage and deriving action by such movement for changing the degree of angularity of the pressing-members relative to the form and in predetermined relation to certain portions of the surface thereof.

156. A tire-making machine including a support, a carriage thereon, a tire-form juxtaposed to the carriage, fabric-pressing members supported on the carriage, means for effecting a traveling movement of the carriage in relation to the tire-form, means for moving the pressing-members into a contacting position with relation to the tire-form, and means independent of the tire-form and operative during the movement of the carriage for changing the degree of angularity of the pressing-members relative to the form and in predetermined relation to certain portions of the surface thereof and during the time that the pressing-members are in contacting relation with such surface of the tire-form.

157. A tire-making machine including a support, a tire-form, transversely-spaced element-sustaining members mounted on the support in juxtaposition to the form, slidable presser-sustaining elements on said members, presser devices carried by said elements and engagingly related to the form, means for rotating said presser-devices to effect their angular positioning, pressure-fluid operated means for actuating said presser-sustaining elements while the presser-devices are being given an angular positioning movement in relation to the form and simultaneously with their rotative movement, and a carriage upon which said element-sustaining members are mounted and whereby, also, said presser-devices are positioned in relation to the tire-form.

158. A tire-making machine including a supporting structure, a tire-form sustained thereby, a carriage mounted on said supporting structure and movable in relation to the form, cross-heads mounted on the carriage, means for shifting said cross-heads, brackets mounted on said cross-heads, fabric-manipulating members slidably mounted in said brackets, and means for moving said brackets on their axes in said cross-heads.

159. A tire-making machine including a support, a tire-form sustained thereby, a carriage mounted thereon and movable in relation to the form, brackets carried by the carriage and transversely adjustable thereon, means for changing the transverse relation of said brackets, cross-heads slidably mounted in said bracket, means for actuating said cross-heads to effect straightaway and rotative movements thereof relative to the form, and fabric-manipulating devices sustained by said cross-heads and adapted to be positioned thereby in relation to the form.

160. In a tire-making machine, a support, a tire-form sustained thereby, a carriage mounted on said support and movable in relation to said form, cross-heads slidably mounted on said carriage, means deriving motion during the movement of the carriage for actuating said cross-heads, pressing-members journaled in said cross-heads and each rotatable on a vertical axis, means for rotating the pressing-members during the actuating movement of the cross-heads whereby the angular positioning of the pressing-members with relation to the form may be effected independently of the positioning of said pressing-members resulting from the movement of said carriage in relation to the form, and pneumatically-operated devices for actuating the pressing-members into engagement with the tire-form and for yieldingly maintaining them in such engagement.

161. In a tire-making machine, a support, a tire-form sustained thereby, a carriage mounted on said support and movable in relation to said form, cross-heads slidably mounted on said carriage, means deriving motion during the movement of the carriage for actuating said cross-heads, pressing-members journaled in said cross-heads and each rotating on a vertical axis, means for rotating the pressing-members during the actuating movement of the cross-heads whereby the angular positioning of the pressing-members with relation to the form may be effected independently of the positioning of said pressing-members resulting from the movement of said carriage in relation to the form, pneumatically-operated devices for actuating the pressing-members into engagement with the tire-form and for yieldingly maintaining them in such engagement, and means for effecting an advancing movement of said carriage in relation to said tire-form.

162. In a tire-making machine, a support, a tire-form sustained thereby, a carriage mounted on said support and movable in relation to said form, cross-heads slidably mounted on said carriage, means deriving motion during the movement of the carriage for actuating said cross-heads, pressing-members journaled in said cross-heads and each rotating on a vertical axis, means for rotating the pressing-members during the actuating movement of the cross-heads whereby the angular positioning of the pressing-members with relation to the form may be effected independently of the positioning of said pressing-members resulting from the movement of said carriage in relation to the form, pneumatically-operated devices for actuating the pressing-members into engagement with the form and for yieldingly maintaining them in such engagement, means for effecting an advancing movement of said carriage in relation to said tire-form, and means for effecting a receding movement of said presser-members away from said tire-form.

163. In a tire-making machine, a support, a tire-form sustained thereby, a carriage mounted on said support and movable in relation to said form, cross-heads slidably mounted on said carriage, means deriving motion during the movement of the carriage for actuating said cross-heads, pressing-members journaled in said cross-heads and each rotating on a vertical axis, means for rotating the pressing-members during the actuating movement of the cross-heads whereby the angular positioning of the pressing-members with relation to the form may be effected independently of the positioning of said pressing-members resulting from the movement of said carriage in relation to the form, pneumatically-operated devices for actuating the pressing-members into engagement with the form and for yieldingly maintaining them in such engagement, means for effecting an advancing movement of said carriage in relation to said form, means for effecting a receding movement of said carriage away from said tire-form, such receding movement of the carriage effecting a receding movement also of said pressing-members away from the form additional to that produced by the movement of the carriage.

164. In a tire-making machine, a supporting structure, a tire-form mounted thereon, a carriage arranged in juxtaposition to said form, means for effecting movement of said carriage in relation to said form, fabric-manipulating devices positionable by said carriage, fluid-pressure-operated means for operating said fabric-manipulating devices in relation to said form, and means for changing the angular relation of the manipulating devices in relation to the form.

165. A tire-making machine including a support, a carriage thereon, a tire-form arranged in juxtaposition to the support, a pair of juxtaposed fabric-pressing members carried by the carriage, power-operated means for effecting movement of the carriage to position the pressing-members in proximity to the tire-form, member-sustaining elements movable on the carriage and on which said pressing-members are rotatably sustained, means for effecting a sliding movement of said elements to advance said pressing-members toward the form, mechanism deriving motion from said sliding movement of the elements to rotate said pressing-members, and means for moving said members toward the form.

166. A tire-making machine including a supporting structure, a tire-form juxtaposed thereto, a carriage mounted on the supporting structure, carriage-driving mechanism for effecting movement of the carriage in relation to the form, a pair of fabric-manipulating devices mounted in spaced relation on the carriage and positionable thereby in relation to the form, fluid-pressure-operated mechanism for actuating said manipulating devices in relation to the form, and independent means for changing the angular relation of the manipulating devices in relation to the form.

167. A tire-making machine including a supporting structure, a tire-form supporting-device mounted thereon, mechanism for rotating said device, a carriage mounted on the supporting structure, carriage-feeding mechanism for automatically effecting an advancing movement of the carriage toward the form-supporting device, means for automatically connecting the carriage to and disconnecting it from its feeding mechanism, fabric-manipulating devices positionable by said carriage, and fluid-pressure-operated means for automatically actuating said devices in relation to the form-supporting device and for engaging said devices with the form with a substantially constant and predetermined pressure.

168. The combination of a support, a rotatable tire-form, a movable carriage, a member-sustaining carriage thereon, a fabric-pressing member carried by the sustaining carriage and bodily movable thereon, means operative to move the sustaining carriage relatively to the form, means for moving said fabric-pressing member on a vertical axis relatively to the sustaining carriage during the movement of the latter, and means for shifting said vertical axis relative to the carriage.

169. The combination of a support, a rotatable tire-form, a movable carriage, a member-sustaining carriage thereon, a fabric-pressing member supported on a vertical axis on the sustaining carriage, and actuating mechanism including means for effecting a rotative movement of the form, means automatically to move the sustaining carriage during the rotation of the form, and means for shifting the vertical axis of the pressing-member in relation to the carriage.

170. The combination of a support, a rotatable tire-form, a movable carriage, a member-sustaining carriage thereon, a fabric-pressing member supported on a vertical axis on the sustaining carriage and bodily movable thereon, actuating mechanism including means to rotate said form, means automatically to move said movable carriage during the rotation of said form, and means for bodily moving said fabric-pressing member and its vertical axis relatively to one of said carriages during the movement of the member-sustaining carriage.

171. The combination of a support, a rotatable form, a movable carriage shiftable in relation to the form, a roller-sustaining carriage on the movable carriage, a fabric-roller carried by the sustaining carriage and bodily shiftable thereon, means operative to move the movable carriage relatively to the form, power-actuated means operative automatically to move the sustaining carriage relatively to the form during the movement of the movable carriage, and means for moving said roller relatively to said form during the movement of both carriages.

172. A tire-making machine including a support, a carriage thereon, a rotatable tireform disposed in juxtaposition to the same, automatic means for traversing the carriage toward and away from the form, a power-operated pressing-member carried by the carriage and positionable thereby in relation to the form, and automatic means for effecting a positioning movement of said member in relation to the form distinct from the positioning movement of the carriage.

173. A tire-making machine including a support, a carriage thereon, a rotatable tireform disposed in juxtaposition to the same, power-operated means for traversing the carriage toward and away from the form, and power-operated pressing-member carried by the carriage and positionable thereby in relation to the form, and automatic means operating during the positioning movement of the carriage for effecting a positioning movement of the member in relation to the form distinct from such carriage-positioning movement.

174. A tire-making machine including a support, a carriage thereon, a rotatable tireform disposed in juxtaposition to the same, means for traversing the carriage toward and away from the form, a pressing-member carried by the carriage and positionable thereby in relation to the form, power-operated means for effecting a positioning movement of said member in relation to the form distinct from the positioning movement of the carriage, and automatic means for effecting motion of said member toward the form distinct from said positioning movements.

175. A tire-making machine including a support, a carriage thereon, a rotatable tireform disposed in juxtaposition to the same, means for traversing the carriage toward and away from the form, a pressing-member carried by the carriage and positionable thereby in relation to the form, means for effecting a positioning movement of said member in relation to the form distinct from the positioning movement of the carriage, and power-operated means for effecting motion of said member toward and away from the form distinct from both of such positioning movements.

176. A tire-making machine including a support, a carriage thereon, a rotatable tireform disposed in juxtaposition to the same, means for traversing the carriage toward and away from the form, a power-operated pressing-member carried by the carriage and positionable thereby in relation to the form, means for effecting a positioning movement of said member in relation to the form distinct from the positioning movement of the carriage, and power-operated means for effecting a pressing motion of said member toward said form and maintaining it in operative contact therewith.

177. A tire-making machine including a support, a carriage thereon, a rotatable tireform disposed in juxtaposition to the same, means for traversing the carriage toward and away from the form, a pressing-member carried by the carriage and positionable thereby in relation to the form, means for effecting a positioning movement of said member in relation to the form distinct from the positioning movement of the carriage, power-operated means for effecting a pressing motion of said member toward said form and maintaining it in operative contact therewith, and power-operated means for returning said member to normal position.

178. A tire-making machine including a support, a carriage thereon, a rotatable tireform disposed in juxtaposition to the same, means for traversing the carriage toward and away from the form, a pressing-member carried by the carriage and positionable thereby in relation to the form, means for effecting a positioning movement of said member in relation to the form distinct from the positioning movement of the carriage, power-operated means for effecting a pressing motion of said member toward said form and maintaining it in operative contact therewith, and power-operated means for withdrawing said member from contact with the form.

179. A tire-making machine including a support, a carriage thereon, a rotatable tireform disposed in juxtaposition to the carriage, means for traversing the carriage toward and away from the form, a pressing-member carried by the carriage and positionable thereby in relation to the form, means for effecting a positioning movement of said member in relation to the form distinct from the positioning movement of the carriage, power-operated means for effecting a pressing motion of said member toward said form and maintaining it in operative contact therewith, power-operated means for withdrawing said member from contact with the form, and means independent of said withdrawing means for repositioning said member in starting or normal position.

180. A tire-making machine including a support, a carriage thereon, a tire-form juxtaposed in relation to the carriage, pressing-members on the carriage, power-operated means for effecting movement of the carriage to position the pressing-members in proximity to the tire-form, member-sustaining elements carried by the carriage and supporting said pressing-members, power-operated means for moving said elements during the member-positioning movement of the carriage for changing the angular relation of said pressing-members with respect to the tire-form, and means for effecting an advancing and receding movement of the pressing-members in relation to their supporting-elements.

181. A tire-making machine including a support, a carriage thereon, a rotatable tire-form juxtaposed on the support in relation to the carriage, a pair of pressing-members on the carriage, power-operated means for effecting movement of the carriage to position the pressing-members in proximity to the tire-form, member-sustaining elements carried by the carriage and movable thereon and supporting said pressing-members, power-operated means for moving said elements during the member-positioning movement of the carriage for changing the angular relation of said pressing-members with respect to the tire-form, and means for effecting an advancing and receding movement of the pressing-members in relation to their supporting-elements.

182. A tire-making machine including a support, a carriage thereon, a rotatable tire-form juxtaposed on the support in relation to the carriage, a pair of pressing-members on the carriage, power-operated means for effecting movement of the carriage to position the pressing-members in proximity to the tire-form, member-sustaining elements carried by the carriage and movable thereon and supporting said pressing-members, power-operated means for moving said elements during the member-positioning movement of the carriage for changing the relation of said pressing-members with respect to the tire-form, and power-operated means for effecting an advancing and receding movement of the pressing-members in relation to their supporting elements.

183. A tire-making machine including a support, a carriage thereon, a rotatable tire-form juxtaposed on the support in relation to the carriage, a pair of pressing-members on the carriage, power-operated means for effecting movement of the carriage to position the pressing-members in proximity to the tire-form, member-sustaining elements carried by the carriage and movable thereon and supporting said pressing-members, power-operated means for moving said elements during the member-positioning movement of the carriage for changing the angular relation of said pressing-members with respect to the tire-form, and pressure-fluid-operated means for effecting an advancing and receding movement of the pressing-members in relation to their supporting-elements.

184. A tire-making machine including a support, a carriage thereon, a rotatable tire-form juxtaposed on the support in relation to the carriage, a pair of pressing-members on the carriage, power-operated means for effecting movement of the carriage to position the pressing-members in proximity to the tire-form, member-sustaining elements carried by the carriage and movable thereon and supporting said pressing-members, power-operated means for moving said elements during the member-positioning movement of the carriage for changing the relation of said pressing-members with respect to the tire-form, pressure-fluid-operated means for effecting an advancing and receding movement of the pressing-members in relation to their supporting elements, and means under the control of the operator for effecting actuation of said pressure-fluid-operated means.

185. A tire-making machine including a tire-form, mechanism for rotating said form at low speed, mechanism for rotating said form at high speed, driving means for said low and high speed mechanisms, a carriage juxtaposed to said form, actuating means for said carriage to effect an advancing movement thereof in relation to the tire-form, means for connecting said carriage and actuating mechanism to said driving means when said high speed mechanism is operating, pressing-members carried by and movable with said carriage for positioning them in relation to the tire-form, power-operated means for effecting a radial movement of said pressing-members in relation to said tire-form independently of their positioning movement with the carriage, power-operated means for effecting a receding movement of said members away from the form, and means for effecting an angular movement of said pressing-members during the movement of said carriage and while they are in engagement with the tire-form.

186. A tire-making machine including a support, a pressing-member positioning-structure thereon, a fabric-covered tire-form structure mounted adjacent the support, power-operated means for changing the relation between said structures whereby advancing and receding movements of one of the structures in relation to the other are positively effected, means for arresting movement of the advancing structure in predetermined relation to the other, and a power-operated fabric-pressing instrumentality carried and positionable by the advancing structure in definite relation to the other structure and having an elongated and continuous travel along the surface of the form in advance of a bead disposable on the surface thereof and then an accelerated movement over such bead.

187. A tire-making machine including a support, a pressing-member positioning-structure thereon, a tire-form structure mounted adjacent the support, power-operated means for changing the relation between said structures whereby advancing and receding movements of one of the structures in relation to the other are positively effected, means for arresting movement of the moving structure at a predetermined point, a fabric-pressing instrumentality carried and positionable by the advancing structure in definite relation to the other structure, power-operated means for effecting a substantially constant and predetermined pressure of the pressing instrumentality upon the tire-form structure, and power-operated means for effecting a receding movement of the fabric-pressing instrumentality away from said other structure.

188. A tire-making machine including a support, a pressing-member positioning-structure thereon, a tire-form structure mounted adjacent the support, power-operated means for changing the relation between said structures whereby advancing and receding movements of one of the structures are positively effected, means for arresting movement of the advancing structure in predetermined relation to the other, means for changing the point of arrest of such movement, a fabric-pressing instrumentality carried and positionable by the advancing structure in definite relation to the other structure, and power-operated means for effecting a positioning of the pressing-instrumentality away from said other structure.

189. A tire-making machine including a support, a pressing-member structure thereon, a tire-form structure mounted adjacent the support, power-operated means for changing the relation between said structures whereby advancing and receding movements of one of the structures are positively effected, means for arresting movement of the movable structure in predetermined relation to the other, and a plurality of means including power-operated instrumentalities for withdrawing the fabric-pressing instrumentality away therefrom.

190. A tire-making machine including a support, a pressing-member positioning-structure thereon, a tire-form structure mounted adjacent the support, power-operated means for changing the relation between said structures whereby advancing movement of one of the structures is positively effected, means for arresting movement of the advancing structure in predetermined relation to the other, a power-operated fabric-pressing instrumentality carried and positionable by the advancing structure in definite relation to the other structure, and a plurality of means including power-operated instrumentalities for withdrawing the fabric pressing instrumentality away therefrom.

191. A tire-making machine including a support, a pressing-member positioning-structure thereon, a tire-form structure mounted adjacent the support, power-operated means for changing the relation between said structures whereby advancing movement of one of the structures is positively effected, means for arresting movement of the advancing structure in predetermined relation to the other, and a pressure-fluid-operated fabric-pressing instrumentality carried by said positioning-structure and positionable thereby in predetermined relation to the tire-forming structure, whereby a substantially constant and predetermined pressure of the instrumentality upon the form is effected.

192. A tire-making machine including a support, a pressing-member positioning-structure thereon, a tire-form structure mounted adjacent the support, power-operated means for changing the relation between said structures whereby advancing movement of one of the structures is positively effected, means for arresting movement of the advancing structure in predetermined relation to the other, and a pneumatically-operated fabric-pressing instrumentality carried by said positioning-structure and positionable thereby in predetermined relation to the tire-form structure, whereby a substantially constant and predetermined pressure of the instrumentality upon the form is effected.

193. A tire-making machine including a tire-form, mechanism for pressing tire-material on the form, automatic means for moving said mechanism radially across and angularly to the form, means for automatically arresting said radial movement at a predetermined point, and power-operated means for moving said mechanism away from the form.

194. A tire-making machine including a tire-form, means for supplying tire-material thereto, mechanism for pressing the material on the form, automatic means for moving said mechanism radially across and angularly to the form, means for automatically arresting said radial movement at a predetermined point, and power-operated means for moving said mechanism away from the form.

195. A tire-making machine including a tire-form, means for supplying tire-material thereto, power-operated mechanism for pressing the material on the form, automatic means for moving said mechanism radially across and angularly to the form, means for automatically arresting said radial movement at a predetermined point, and power-operated means automatically actuated for moving said mechanism away from the form.

196. A tire-making machine including a tire-form, means for supplying tire-material thereto, power-operated mechanism for pressing the material on the form, power-operated means for moving said mechanism radially across and angularly to the form, power-operated means for changing the paths of travel of said mechanism as it moves over the form, means for automatically arresting said radial movement at a predetermined point, and power-operated means for moving said mechanism away from the form.

197. The combination of a support, a rotatable tire-form, a carriage movable in relation to the form, a fabric-pressing member carried by and rotatable on a vertical axis on the carriage, actuating mechanism for rotating said form, automatic mechanism for bodily shifting said vertical axis of the pressing-member on the carriage during the rotation of the form, actuating mechanism for moving said carriage in relation to the form during its rotative movement, and means for automatically arresting the actuation of said carriage-actuating mechanism when the carriage reaches a predetermined position.

198. The combination of a support, a rotatable tire-form, a carriage movable in relation to the form, a fabric-pressing member carried by and rotatable on a vertical axis on the carriage, actuating mechanism for rotating said form, automatic mechanism for bodily shifting said pressing-member on the carriage during the rotation of the form, actuating mechanism for moving said carriage in relation to the form during its rotative movement, means for automatically arresting the actuation of said carriage-actuating mechanism when the carriage reaches a predetermined position, and means for moving said pressing-member in relation to the form independently of but during the movement of the carriage.

199. The combination of a support, a tire-form, a carriage movable in relation thereto, a fabric-roller carried by the carriage and rotatable on a vertical axis, actuating-mechanism for moving the carriage, power-driven actuating mechanism for bodily shifting the roller on the carriage during the movement thereof both toward and away from the form, automatic means for effecting a rotative movement of the roller on its vertical axis, and means for automatically arresting the actuation of said carriage when it reaches a predetermined position.

200. The combination of a support, a rotatable tire-form, a carriage movable in relation thereto, a fabric-roller carried by and rotatable on a vertical axis on the carriage, power-driven actuating-mechanism for moving the carriage, power-driven actuating mechanism for bodily shifting the roller on the carriage during the movement thereof both toward and away from the form, automatic means for effecting a rotative movement of the roller on its vertical axis, and means for automatically arresting the actuation of said carriage when it reaches a predetermined position.

201. A tire-making machine including a support, a carriage thereon, a tire-form juxtaposed on the support in relation to the carriage, pressing-members on the carriage, power-operated means for effecting movement of the carriage to position the pressing-members in proximity to the tire-form, member-sustaining elements movably carried by the carriage and supporting said pressing-members, automatic means for moving said elements during the member-positioning movement of the carriage for changing the relation of said pressing-members with respect to the tire-form, power-operated means for effecting an advancing and receding movement of the pressing-members in relation to their supporting elements, and automatic means for arresting operation of said pressure means.

202. A tire-making machine including a support, a carriage thereon, a rotatable tire-form juxtaposed on the support in relation to the carriage, a pair of pressing-members on the carriage, power-operated means for effecting movement of the carriage to position the pressing-members in proximity to the tire-form, member-sustaining elements movably carried by the carriage and supporting said pressing-members, automatic means for moving said elements during the member-positioning movement of the carriage for changing the relation of said pressing-members with respect to the tire-form, power-operated means for effecting an advancing and receiving movement of the pressing-members in relation to their supporting elements, means under the control of the operator for effecting actuation of said pressure-operated means, and automatic means for arresting operation of said pressure means.

203. In a tire-making machine, a support, a carriage mounted on the support, pressing-members carried by the carriage and positionable thereby, fluid-pressure-operated devices for actuating said pressing-members, and for effecting a substantially constant and predetermined pressing action thereon and means for arresting movement of the carriage at a predetermined position in its travel and for automatically operating said pressure-devices.

204. In a tire-making machine, a support, a carriage mounted on the support, pressing-members carried by the carriage and positionable thereby, pressure-operated devices for actuating said pressing-members, means for arresting movement of the carriage at a predetermined position in its travel and for automatically operating said pressure-devices, and means for automatically changing the relative degree of angularity of the pressing-members with respect to the form.

205. In a tire-making machine, a support, a carriage mounted on the support, pressing-members carried by the carriage and positionable thereby, pressure-operated devices for actuating said pressing-members, means for arresting movement of the carriage at a predetermined position in its travel and for automatically operating said pressure-devices, and means for automatically changing the relative degree of angularity of the pressing-members with respect to the form and operating during an advancing movement of the carriage.

206. In a tire-making machine, a support, a carriage mounted on the support, pressing-members carried by the carriage and positionable thereby, pressure-operated devices for actuating said pressing-members, means for arresting movement of the carriage at a predetermined position in its travel and for automatically operating said pressure-devices, means for changing the relative degree of angularity of the pressing-members with respect to the form during an advancing movement of the carriage, and means for effecting a receding movement of the pressing-members during a return movement of the carriage.

207. In a tire-making machine, a support, a carriage mounted on the support, pressing-members carried by the carriage and positionable thereby, pneumatic devices for actuating the pressing-members, and means for arresting movement of the carriage at a predetermined position in its travel and for operating said pneumatic devices to cut off supply thereto of pressure-fluid, said means being adjustable to vary the point at which such arresting movement of the carriage and operation of the pneumatic devices are effected.

208. In a tire-making machine, a support, a carriage mounted on the support, pressing-members carried by the carriage and positionable thereby, pneumatic devices for actuating the pressing-members, and means for arresting movement of the carriage at a predetermined position in its travel and for automatically operating said pneumatic devices to cut off supply thereto of pressure-fluid.

209. In a tire-making machine, a support, a tire-form sustained thereby, a carriage mounted on the support and movable in relation to the form, pressing-members carried by the carriage and positionable thereby, pneumatic devices for actuating the pressing-members in relation to the form, and means for arresting the movement of the carriage at a predetermined position in its travel and for automatically operating said pneumatic devices to cut off supply thereto of pressure-fluid.

210. In a tire-making machine, a support, a tire-form sustained thereby, a carriage mounted on the support and movable in relation to the form, pressing-members carried by the carriage and positionable thereby, pneumatic devices for actuating the pressing-members in relation to the form, and means for arresting the movement of the carriage at a predetermined position in its travel and for operating said pneumatic devices to cut off supply thereto of pressure-fluid, said means being adjustable to vary the point at which such arresting movement of the carriage and operation of the pneumatic devices are effected.

211. A tire-making machine including a tire-form, a traveling structure having a cycle of at least two distinct advancing movements in relation thereto, fabric-manipulating instrumentalities supported on said structure and positionable thereby in relation to the form, instrumentality-sustaining devices movably mounted on the traveling structure, means for arresting the structure at any of a plurality of predetermined points in relation to a portion of said tire-form, and mechanism for actuating said devices on said supporting structure in the same approximate direction as the advancing movements thereof in respect to the form.

212. A tire-making machine including a tire-form, a traveling structure having a cycle of at least two distinct advancing movements in relation thereto, fabric-manipulating instrumentalities supported on said structure and positionable thereby in relation to the form, instrumentality-sustaining devices movably mounted on the traveling structure, means for automatically arresting the structure at any of a plurality of predetermined points in relation to a portion of said tire-form, and mechanism for actuating said devices on said supporting structure in the same approximate direction as the advancing movements thereof in respect to the form.

213. A tire-making machine including a tire-form, a traveling structure having a cycle of at least two distinct advancing movements in relation thereto, fabric-manipulating instrumentalities supported on said structure and positionable thereby in relation to the form, instrumentality-sustaining devices movably mounted on the traveling structure, means for arresting the structure at any of a plurality of predetermined points in relation to a portion of said tire-form, mechanism for actuating said devices on said supporting structure in respect to the form, means for adjusting said actuating mechanism to effect movement of said devices a greater distance during one travel of the structure than during a preceding travel thereof and in predetermined relation to the point at which movement of said structure is arrested, and means for varying the rate of said actuating movement of the devices whereby said manipulating instrumentalities are given an accelerated motion at a predetermined point in relation to said portions of the tire-form.

214. A tire-making machine including a tire-form, a traveling structure having a cycle of at least two distinct advancing movements in relation thereto, fabric-manipulating instrumentalities supported on said structure and positionable thereby in relation to the form, instrumentality-sustaining devices movably mounted on the traveling structure, means for arresting the structure at any of a plurality of predetermined points in relation to a portion of said tire-form, mechanism for actuating said devices on said supporting structure in respect to the form, means for adjusting said actuating mechanism to effect movement of said devices a greater distance during one travel of the structure than during a preceding travel thereof and in predetermined relation to the point at which movement of said structure is arrested, means for varying the rate of said actuating movement of the devices whereby said manipulating instrumentalities are given an accelerated motion at a predetermined point in relation to said portions of the tire-form, and means for changing the degree of angularity of said instrumentalities in predetermined relation to said accelerated motion of the devices.

215. A tire-making machine including a tire-form, a traveling structure having a cycle of at least two distinct advancing movements in relation thereto, a fabric-manipulating instrumentality supported on said structure and positionable thereby in relation to the form, an instrumentality-sustaining device mounted on the traveling structure, means for automatically arresting the structure at any of a plurality of predetermined points in relation to a portion of said tire-form, mechanism for actuating said devices on said supporting structure in respect to the form, and means for adjusting said actuating means to effect movement of said devices for a longer travel during one part of the cycle of movement of the structure than during a preceding travel thereof and in predetermined relation to the point at which said structure is arrested.

216. A tire-making machine including a tire-form, a traveling structure having a cycle of at least two distinct advancing movements in relation thereto, a fabric-manipulating instrumentality supported on said structure and positionable thereby in relation to the form, an instrumentality-sustaining device mounted on the traveling structure, means for automatically arresting the structure at any of a plurality of predetermined points in relation to a portion of said tire-form, mechanism for actuating said devices on said supporting structure in respect to the form, said fabric-manipulating instrumentality having an elongated and continuous travel along the surface of the form in advance of a bead thereon and then over the bead.

217. A tire-making machine including a tire-form, a traveling structure having a cycle of at least two distinct advancing movements in relation thereto, a fabric-manipulating instrumentality supported on said structure and positionable thereby in relation to the form, an instrumentality-sustaining device mounted on the traveling structure, means for automatically arresting the structure at any of a plurality of predetermined points in relation to a portion of said tire-form, mechanism for actuating said devices on said supporting structure in respect to the form, and means for adjusting said actuating means to effect movement of said devices for a longer travel during one part of the cycle of movement of the structure than during a preceding travel thereof and in predetermined relation to the point at which said structure is arrested, said fabric-manipulating instrumentality having an elongated and continuous travel along the surface of the form in advance of a bead thereon and then over the bead.

218. A tire-making machine including a tire-form, a traveling structure having a cycle of at least two distinct advancing movements in relation thereto, a fabric-manipulating instrumentality supported on said structure and positionable thereby in relation to the form, an instrumentality-sustaining device mounted on the traveling structure, means for automatically arresting the structure at any of a plurality of predetermined points in relation to a portion of said tire-form, power-operated mechanism for actuating said devices on said supporting structure in respect to the form, said fabric-manipulating instrumentality having an elongated and continuous travel under the action of said power-operated actuating means along the surface of the form in advance of a bead thereon and then over the bead.

219. A tire-making machine including a tire-form, a traveling structure having a cycle of at least two distinct advancing movements in relation thereto, a fabric-manipulating instrumentality supported on said structure and positionable thereby in relation to the form, an instrumentality-sustaining device mounted on the traveling structure, means for automatically arresting the structure at any of a plurality of predetermined points in relation to a portion of said tire-form, mechanism for actuating said devices on said supporting structure in respect to the form, means for adjusting said actuating means to effect movement of said devices for a longer travel during one part of the cycle of movement of the structure than during a preceding travel thereof and in predetermined relation to the point at which said structure is arrested, and power-operated means for effecting the cycle of travel of said structure in relation to the form.

220. A tire-making machine including a tire-form, a traveling structure having a cycle of at least two distinct advancing movements in relation thereto, a fabric-manipulating instrumentality supported on said structure and positionable thereby in relation to the form, an instrumentality-sustaining device mounted on the traveling structure, means for automatically arresting the structure at any of a plurality of predetermined points in relation to a portion of said tire-form, power-operated mechanism for actuating said devices on said supporting structure in respect to the form, and means for adjusting said actuating means to effect movement of said devices for a longer travel during one part of the cycle of movement of the structure than during a preceding travel thereof and in predetermined relation to the point at which said structure is arrested, said fabric-manipulating instrumentality having an elongated travel along the surface of the form in advance of a bead thereon and then over the bead, such movement of said instrumentality being continuous and under the action of the power-operated means.

221. A tire-making machine including a tire-form, a traveling structure having a cycle of at least two distinct advancing movements in relation thereto, a fabric-manipulating instrumentality supported on said structure and positionable thereby in relation to the form, an instrumentality-sustaining device mounted on the traveling structure, means for automatically arresting the structure at any of a plurality of predetermined points in relation to a portion of said tire-form, mechanism for actuating said devices on said supporting structure in respect to the form, means for adjusting said actuating means to effect movement of said devices for a longer travel during one part of the cycle of movement of the structure than during a preceding travel thereof and in predetermined relation to the point at which said structure is arrested, and means for effecting a receding movement of said traveling structure away from the tire-form.

222. A tire-making machine including a tire-form, a traveling structure having a cycle of at least two distinct advancing movements in relation thereto, a fabric-manipulating instrumentality supported on said structure and positionable thereby in relation to the form, an instrumentality-sustaining device mounted on the traveling structure, means for automatically arresting the structure at any of a plurality of predetermined points in relation to a portion of said tire-form, mechanism for actuating said devices radially on said supporting structure in respect to the form, means for adjusting said actuating means to effect movement of said devices for a longer travel during one part of the cycle of movement of the structure than during a preceding travel thereof and in predetermined relation to the point at which said structure is arrested, means for effecting a receding movement of said traveling structure away from the tire-form, and means set into motion by such receding movement of the structure to effect a receding movement of said instrumentality-sustaining devices away from the form additional to that produced by the movement of the structure.

223. In a tire-making machine, a support, a tire-form sustained thereby, a carriage mounted on the support and movable in relation to the form, pressing-members carried by the carriage and positionable thereby in relation to the form, pneumatic devices for actuating the pressing-members in relation to the form, and means for arresting the movement of the carriage at a predetermined position in its travel with respect to the form and for operating said pneumatic devices to cut off supply of pressure-fluid thereto, said means being adjustable to vary the point at which such arresting movement of the carriage and operation of the pneumatic devices are effected.

224. In a tire-making machine, a support, a tire-form sustained thereby, a carriage mounted on the support and having an advancing movement in relation to the form, pressing-members carried by the carriage and positionable thereby in relation to the form, pneumatic devices for actuating the pressing-members in relation to the form, means for arresting the movement of the carriage at a predetermined position in its travel with respect to the form and for operating said pneumatic devices to cut off supply of pressure-fluid thereto, said means being adjustable to vary the point at which such arresting movement of the carriage and operation of the pneumatic devices are effected, and means for changing the degree of angularity of the pressing-members with respect to the form during the advancing movement of the carriage.

225. In a tire-making machine, a support, a tire-form sustained thereby, a carriage mounted on the support and having an advancing movement in relation to the form, pressing-members carried by the carriage and positionable thereby in relation to the form, pneumatic devices for actuating the pressing-members in relation to the form, means for arresting the movement of the carriage at a predetermined position in its travel with respect to the form and for operating said pneumatic devices to cut off supply of pressure-fluid thereto, said means being adjustable to vary the point at which such arresting movement of the carriage and operation of the pneumatic devices are effected, and means for changing the degree of angular engagement of the pressing-members with the form during the advancing movement of the carriage, such means also receiving actuation during a receding movement of the carriage to restore said pressing-members to their original angular position.

226. In a tire-making machine, a support, a tire-form sustained thereby, a carriage mounted on the support and movable in relation to the form, pressing-members carried by the carriage and positionable thereby in relation to the form, pneumatic devices for actuating the pressing-members in relation to the tire-form, means for arresting the movement of the carriage at a predetermined position in its travel with respect to the tire-form and for operating said pneumatic devices to cut off supply of fluid-pressure thereto, said means being adjustable to vary the point at which such arresting movement of the carriage and operation of the pneumatic devices are effected, means for changing the degree of angularity of the pressing-members with respect to the form during the advancing movement of the carriage, and means for effecting a receding movement of the carriage and thereby to effect a return of the pressing-members to their original angular position.

227. In a tire-making machine, a support, a tire-form sustained thereby, a carriage mounted on said support and movable in relation to said form, cross-heads slidably mounted on said carriage, means deriving motion during the movement of the carriage for actuating said cross-heads, pressing-members journaled in said cross-heads and each rotating on a vertical axis, means for rotating the pressing-members during the actuating movement of the cross-heads whereby the angular positioning of the pressing-members with relation to the form may be effected independently of the positioning of said pressing-members resulting from the movement of said carriage in relation to the form, pneumatic devices for actuating the pressing-members into engagement with the form and for yieldingly maintaining them in such engagement, means for effecting an advancing movement of said carriage in relation to said tire-form, means for effecting a receding movement of said carriage away from said tire-form, such receding movement of the carriage effecting a receding movement also of said pressing-members away from the form additional to that produced by the movement of the carriage, and means for automatically arresting the carriage in its advancing movement at a predetermined position in relation to the form.

228. In a tire-making machine, a support, a tire-form sustained thereby, a carriage mounted on said support and movable in relation to said form, cross-heads slidably mounted on said carriage, means deriving motion during the movement of the carriage for actuating said cross-heads, pressing-members journaled in said cross-heads and each rotating on a vertical axis, means for rotating the pressing-members during the actuating movement of the cross-heads whereby the angular positioning of the pressing-members with relation to the form may be effected independently of the positioning of said pressing-members resulting from the movement of said carriage in relation to the form, pneumatically-operated devices for actuating the pressing-members into engagement with the form and for yieldingly maintaining them in such engagement, means for effecting an advancing movement of said carriage in relation to said form, means for effecting a receding movement of said carriage away from said form, such receding movement of the carriage effecting a receding movement also of said pressing-members away from the form additional to that produced by the movement of the carriage, means for automatically arresting the carriage in its advancing movement at a predetermined position in relation to the tire-form, and means for operating said pneumatic devices in predetermined relation to the arresting movement of the carriage.

229. In a tire-making machine, a support, a tire-form sustained thereby, a carriage mounted on said support and movable in relation to said form, cross-heads slidably mounted on said carriage, means deriving motion during the movement of the carriage for actuating said cross-heads, pressing-members journaled in said cross-heads and each rotating on a vertical axis, means for rotating the pressing-members during the actuating movement of the cross-heads whereby the angular positioning of the pressing-members with relation to the form may be effected independently of the positioning of said pressing-members during movement of said carriage in relation to the form, pneumatic devices for actuating the pressing-members into engagement with the form and for yieldingly maintaining them in such engagement, means for effecting an advancing movement of said carriage in relation to said form, means for effecting a receding movement of said carriage away from said form, such receding movement of the carriage effecting a receding movement also of said pressing-members away from the tire-form additional to that produced by the movement of the carriage, means for automatically arresting the carriage in its advancing movement at a predetermined position in relation to the tire-form, and automatic means for operating said pneumatic devices in predetermined relation to the arresting movement of the carriage.

230. In a tire-making machine, a support, a tire-form sustained thereby, a carriage mounted on said support and movable in relation to said form, cross-heads slidably mounted on said carriage, means deriving motion during the movement of the carriage for actuating said cross-heads, pressing-members journaled in said cross-heads and each rotating on a vertical axis, means for rotating the pressing-members during the actuating movement of the cross-heads whereby the angular positioning of the pressing-members with relation to the form may be effected independently of the positioning of said pressing-members during the movement of said carriage in relation to the form, pneumatic devices for actuating the pressing-members into engagement with the form and for yieldingly maintaining them in such engagement, presser-returning means, means for effecting an advancing movement of said carriage in relation to said form, means for effecting a receding movement of said carriage away from said tire-form, such receding movement of the carriage effecting a receding movement also of said pressing-members away from the tire-form additional to that produced by the movement of the carriage, means for automatically arresting the carriage in its advancing movement at a predetermined position in relation to the form, and automatic means for operating said pneumatic devices in predetermined relation to the arresting movement of the carriage, including an air-valve and means for operating the same to cut off supply of air to the pneumatic devices, to permit escape of air therefrom, and to permit operation of said presser-returning means.

231. A tire-making machine including a tire-form, means for initially rotating said tire-form at slow speed, after application thereto of tire material, a carriage juxtaposed to the tire-form, means for advancing the carriage toward the tire-form, means for rotating the tire-form at high speed during the advancing movement of the carriage for a fabric-pressing action, fabric-manipulating mechanism carried by the carriage and positionable thereby in operative relation to the tire-form while the latter is rotated at high speed and comprising fabric-pressing members, means for projecting said members toward the form and for maintaining them in contact with the fabric thereon during the advancing movement of the carriage, and power-operated means for effecting a receding movement of the fabric-manipulating mechanism away from the form.

232. A tire-making machine including a tire-form, a carriage juxtaposed to the tire-form, means for advancing the carriage toward the tire-form, means for rotating the tire-form in synchronism with the advancing movement of the carriage, fabric-manipulating mechanism carried by the carriage and positionable thereby in operative relation to the tire-form and comprising fabric-pressing members, automatic means for projecting said members toward the form independently of the advancing movement of the carriage and for maintaining them in contact with the fabric thereon during the advancing movement of the carriage, means for effecting a receding movement of the carriage away from the form, and automatic means distinct from the carriage for effecting a withdrawal of said pressing-members away from the form during the receding movement of the carriage.

233. A tire-making machine including a tire-form, a carriage juxtaposed to the tire-form, means for advancing the carriage toward the tire-form, means for rotating the tire-form in synchronism with the advancing movement of the carriage, fabric-manipulating mechanism carried by the carriage and positionable thereby in operative relation to the tire-form and comprising fabric-pressing members, means for projecting said members toward the form and for maintaining them in contact with the fabric thereon during the advancing movement of the carriage, and power-operated means set in motion by a return movement of the carriage for effecting a receding movement of the fabric-manipulating mechanism away from the form.

234. A tire-making machine including a tire-form, a carriage juxtaposed to the tire-form, means for advancing the carriage toward the tire-form, means for rotating the tire-form in synchronism with the advancing movement of the carriage, fabric-manipulating mechanism carried by the carriage and positionable thereby in operative relation to the tire-form and comprising fabric-pressing members, automatic means for projecting said members toward the form at a speed more rapid than the travel of the carriage and for maintaining them in contact with the fabric thereon during the advancing movement of the carriage, means for effecting a receding movement of the carriage away from the form, and automatic means distinct from the carriage for effecting a withdrawal of said pressing-members away from the form during the receding movement of the carriage.

235. A tire-making machine including a tire-form, a carriage juxtaposed to the tire-form, power-actuated means for advancing the carriage toward the tire-form, means for rotating the tire-form in synchronism with the advancing movement of the carriage, fabric-manipulating mechanism carried by the carriage and positionable thereby in operative relation to the tire-form and comprising fabric-pressing members, means for projecting said members toward the form at a speed more rapid than the travel of the carriage and for maintaining them in contact with fabric thereon during the advancing movement of the carriage, and power-operated means for effecting a receding movement of the fabric-manipulating mechanism away from the form.

236. A tire-making machine including a tire-form, means for supplying tire-material thereto, means for initially rotating said tire-form at slow speed, a carriage juxtaposed to the tire-form, means for advancing the carriage toward the tire-form, means for rotating the tire-form in synchronism with the advancing movement of the carriage, fabric-manipulating mechanism carried by the carriage and positionable thereby in operative relation to the tire-form and comprising fabric-pressing members, power-operated means for projecting said members toward the form at a speed more rapid than the travel of the carriage and for maintaining them in contact with the fabric thereon during the advancing movement of the carriage, and power-operated means for effecting a receding movement of the fabric-manipulating mechanism away from the form.

237. A tire-making machine including a tire-form, means for supplying tire-material thereto, means for initially rotating said form at slow speed, a carriage juxtaposed to the form, power-operated means for advancing the carriage toward the form, means for rotating the form in synchronism with the advancing movement of the carriage, fabric-pressing mechanism carried by the carriage and positionable thereby in operative relation to the form and comprising fabric-pressing members, automatic means for projecting said members toward the form at a speed more rapid than the travel of the carriage and for maintaining them in contact with fabric thereon during the advancing movement of the carriage, means for effecting a receding movement of the carriage away from the form, and automatic means distinct from the carriage for effecting a withdrawal of said pressing-members away from the form during the receding movement of the carriage.

238. In a tire-making machine, a support, a tire-form sustained thereby, a carriage having a movement thereon in relation to the form, fabric-pressing means positionable by said carriage, fluid-pressure-operated means for actuating said pressing means and for maintaining the same with a substantially constant and predetermined pressure in contact against the form, and fabric-trimming mechanism sustained by said carriage and positionable thereby in relation to the form in sequence to the operation of the fluid-pressure-operated means.

239. In a tire-making machine, a support, a tire-form sustained thereby, a carriage having a movement thereon in relation to the form, fabric-pressing means positionable by said carriage, pneumatic means for operating said pressing means and for maintaining the same with a substantially constant and predetermined pressure in contact against the form, and fabric-trimming mechanism sustained by said carriage and positionable thereby in relation to the form in sequence to the operation of the fluid-pressure-operated means, including a cutter normally removed from the form but movable into a cutting position in relation thereto.

240. In a tire-making machine, a support, a rotatable tire-form, fabric-pressing means mounted on and positionable by said support, fluid-pressure-operated means for actuating said pressing means and for maintaining the same with a substantially constant and predetermined pressure in contact against the form, fabric-trimming mechanism sustained by said support and positionable thereby in relation to the form in sequence to the operation of the fluid-pressure operated means and including a lever fulcrumed on a part carried by the support, a knife pivoted on the lever, and means for guiding the knife.

241. In a tire-making machine, a support, a rotatable tire-form, fabric-pressing means mounted on and positionable by said support, fluid-pressure operated means for actuating said pressing means and for maintaining the same with a substantially constant and predetermined pressure in contact against the form, fabric-trimming mechanism sustained by said support and positionable thereby in relation to the form in sequence to the operation of the fluid-pressure operated means and including a part carried by said support and having guiding walls, a carriage slidably fitted to said guiding walls, means operative to adjust said carriage, a bracket pivoted on said carriage and having a guide-slot therein, a lever fulcrumed on said bracket, and a knife carried by the lever and extending into said slot.

242. In a tire-making machine, a support, a rotatable tire-form, fabric-pressing means mounted on and positionable by said support, fluid-pressure operated means for actuating said pressing means, fabric-trimming mechanism sustained by said support and positionable thereby in relation to the form in sequence to the operation of the fluid-pressure operated means and including a part carried by said support and having guiding walls, a carriage slidably fitted to said guiding walls, means operative to adjust said carriage, a bracket pivoted on said carriage, means operative to adjust said bracket on its pivot, and a knife carried by said bracket.

243. An apparatus for shaping tire fabric upon a core, comprising a movable carriage, a pair of elements mounted thereon for shaping the fabric around the core, means for maintaining the shaping elements with a substantially constant and predetermined pressure in contact against the form, means for moving said carriage longitudinally in respect to the core, means for varying the distance between said elements as the carriage advances toward the core, and means for simultaneously and automatically changing the inclination of said elements with respect to the surface of the core, substantially as described.

244. An apparatus for shaping tire fabric upon a core comprising a movable carriage, a pair of arms pivotally mounted thereon, a pair of freely rotatable forming discs carried by said arms, means for moving said carriage toward and from the core, means for varying the distance between said arms, and means for automatically changing the angular position of said forming discs in respect to the surface of the core, substantially as described.

245. Apparatus for shaping tire fabric on a core, comprising a movable carriage, a pair of fabric shaping elements, arms supporting the same, supports on the carriage movable towards and from each other to which said arms are pivotally connected, and positively operated means synchronizing with the movement of the carriage for automatically swinging said arms on their pivots.

246. The combination of a support, a rotatable tire-form, a carriage movable in relation to the form, a fabric-pressing member carried by and rotatable on a vertical axis on the carriage, actuating mechanism associated with the carriage for automatically and bodily shifting said vertical axis of the pressing-member on the carriage during the rotation of the form, actuating mechanism for moving said carriage in relation to the form during its rotative movement, and means for automatically arresting the actuation of the said carriage-actuating mechanism when the carriage reaches a predetermined position.

247. The combination of a support, a rotatable tire-form, a carriage movable in relation to the form, a fabric-pressing member carried by and rotatable on a vertical axis on the carriage, actuating-mechanism associated with the carriage for automatically and bodily shifting said pressing member on the carriage during the rotation of the form, actuating mechanism for moving said carriage in relation to the form during its rotative movement, means for automatically arresting the actuation of said carriage-actuating mechanism when the carriage reaches a predetermined position, and means for moving said pressing-member in relation to the form independently of but during the movement of the carriage.

248. A tire-building machine including a core upon which a tire may be built, means for rotating the core, forming rolls engageable with the core, and power-actuated mechanism operatively associated with the rolls for effecting angular as well as radial movement of the rolls for forming tire material on the core.

249. A tire-building machine including a core upon which a tire may be built, mechanism adapted to pass radially across the core for forming tire material thereon, automatic means for holding said mechanism against the core, and means for automatically varying the angularity of engagement of the mechanism with the core.

250. A tire-building machine comprising a core upon which a tire may be built, mechanism including a fabric presser adapted to pass radially across the core for forming tire material thereon, automatic means for holding the mechanism against the core, a traveling support for the presser, automatic means for varying the angularity of engagement of the presser with the core, and means distinct from the traveling support for automatically restoring the presser to normal position.

251. A tire-building machine comprising a core upon which a tire may be built, a pair of devices adapted to pass radially across the core for forming tire material thereon, automatic means for holding the devices against the core, and automatic means for simultaneously varying the angularity of engagement of each of the devices relatively to the core.

252. A tire-building machine comprising a core upon which a tire may be built, mechanism for forming tire material on the core, automatic means for moving the mechanism radially across the core, automatic means for varying the angularity of engagement of the forming mechanism in relation to the core, and means for automatically stopping said radial movement at a predetermined point.

253. A tire-building machine comprising a core upon which a tire may be built, mechanism for forming tire material on the core, automatic means for moving the mechanism radially across the core, automatic means for varying the angularity of engagement of the forming mechanism in relation to the core, means for automatically stopping said radial movement at a predetermined point, and automatic means for returning the forming mechanism to normal position and at the same time operating said angularity-varying means to change the position of the mechanism in respect to the core.

254. A tire-building machine comprising a tire-forming core, mechanism for forming tire material thereon, automatic means for moving the mechanism radially across the core, automatic means for pressing the mechanism against the core, automatic means for effecting an angular movement of the forming mechanism with respect to the core, and means for automatically stopping both the radial and angular movements at a predetermined point.

255. A tire-building machine comprising a tire-forming core, mechanism for forming tire material thereon, automatic means for moving the mechanism radially across the core, automatic means for pressing the mechanism against the core, automatic means for effecting an angular movement of the forming mechanism with respect to the core, means for automatically stopping both the radial and angular movements at a predetermined point, and automatic means for speedily restoring the forming mechanism to normal position.

256. A tire-building machine comprising a tire-forming core, mechanism for forming tire material thereon, automatic means for moving the mechanism radially across both sides of the core, and means for automatically effecting an angular movement of the forming mechanism at a predetermined point of the radial movement thereof.

257. A tire-building machine comprising a core, mechanism for forming tire material thereon including a device adapted to move radially with respect to the core, forming elements carried by the device and arranged to engage the core at an angle to the plane thereof, and means for automatically varying the angle of engagement of the forming elements simultaneously with their radial movement.

258. A tire-building machine comprising a core, mechanism for forming tire material thereon including a device adapted to move radially with respect to the core, forming elements carried by the device and arranged to engage the core at an angle to the plane thereof, and means for automatically varying the angle of engagement of both of the forming elements with the core simultaneously with, and at a predetermined point in the course of, their radial movement.

259. A tire-building machine comprising a core, mechanism for forming tire material thereon including a device adapted to move radially with respect to the core, forming elements carried by the device and arranged to engage material on the core at an angle to such material, and automatic means for progressively changing the angle of engagement of the forming elements with the core at a predetermined stage of the forming operation.

260. A tire-building machine comprising a core, mechanism for forming tire material thereon including a device adapted to move radially with respect to the core, forming elements carried by the device and arranged to engage material thereon at an angle to such material, automatic means for initiating a predetermined angular engagement of the forming elements with the core, and automatic means for varying such angle of engagement at a predetermined stage in the forming operation.

261. A tire-building machine comprising a core, mechanism for forming tire material thereon, including forming elements, and automatic means operating independently of the core for effecting movement of the elements radially and, also, angularly in relation to the core at a predetermined stage in the forming operation for automatically maintaining and then varying the angle of engagement of the elements with material on the core.

262. A tire-building machine comprising a core, mechanism for forming tire material thereon, including forming elements, and means operating distinct from the core for automatically effecting movement of the elements radially and, also, angularly to the core and for maintaining the operating face of each of the forming elements in engagement with the core and for automatically varying the angle of engagement with material on the core at a predetermined stage of the forming operation.

263. A tire-building machine comprising a core, mechanism for forming tire material thereon, including a device adapted to move radially in respect to the core, forming elements carried by the device, automatic means for shifting the elements on a vertical axis for varying the angle of their engagement with the core at a predetermined stage of the forming operation, and automatic means for pressing the forming elements against the material on the core during the action of the angle-varying means.

264. A tire-building machine comprising a core, mechanism for forming tire material on the core, including a device adapted to move radially with respect to the core, forming elements associated with the device, automatic means for pressing the elements toward the core, and automatic means for bodily shifting the device and, therethrough, the forming elements for varying their relation to the core.

265. A tire-building machine including a core, mechanism for forming tire material thereon and comprising forming elements, automatic means operating to move the elements radially with respect to the core, automatic means independent of the core and operating to move the elements angularly in respect to the surface of the core, means for pressing the elements toward the core, and means made active by the pressing-means and having a normal tendency to resist the action thereof.

266. A tire-building machine comprising a core, mechanism adapted to pass radially across the core for forming portions of the material about the sides thereof, automatic means for effecting movement of the mechanism radially with respect to the axis of the core, and automatic means for varying the angle of engagement of the mechanism with respect to the core and operating in synchronism with the action of the movement-effecting mechanism.

267. A tire-building machine comprising a core, a pair of devices adapted to pass radially across the core for forming tire material on the sides thereof, automatic means for holding the devices yieldingly but with a constant and predetermined pressure against the core, means for varying the angular engagement of said device with respect to the core, and means for automatically throwing said last-mentioned means into and out of operative position.

268. A tire-building machine comprising a core, mechanism for forming tire material on the sides thereof, automatic means for moving the mechanism radially across the core, automatic means for pressing the mechanism against the core, automatic means for varying the angle of engagement of the mechanism with the core, and means for automatically stopping both the radial and the angular movements of the mechanism at a predetermined point.

269. A tire-building machine comprising a core, mechanism for forming tire material on the sides thereof, automatic means for moving the mechanism radially across the core, automatic means for pressing the mechanism against the core, automatic means for varying the angle of engagement of the mechanism with the core, means for automatically stopping both the radial and the angular movements of the mechanism at a predetermined point, and automatic means for then restoring the mechanism to normal position.

270. A tire-building machine comprising a core, mechanism for forming tire material on the sides thereof, automatic means for moving the mechanism radially across the core, automatic means for pressing the mechanism against the core, automatic means for varying the angle of engagement of the mechanism with the core, means for automatically stopping both the radial and the angular movements of the mechanism at a predetermined point, and automatic means for effecting a separation of the mechanism from the core and, also, a retraction of such mechanism to normal position.

271. A tire-building machine comprising a core, mechanism for forming tire material on the sides thereof, automatic means for varying the angle of engagement of the forming mechanism with the core, automatic means for moving said mechanism radially across the sides of the core both before and during the action of said angle-varying means, and means for automatically stopping said radial movement at a predetermined point.

272. A tire-building machine comprising a core, mechanism for forming tire material on the sides thereof, automatic means for varying the angle of engagement of the forming mechanism with the core, automatic means for moving said mechanism radially across the sides of the core both before and during the action of said angle-varying means, means for automatically stopping said radial movement at a predetermined point, and means for then effecting a return movement of the forming mechanism.

273. A tire-building machine comprising a core, mechanism for forming tire material on the sides thereof, automatic means for varying the angle of engagement of the forming mechanism with the core, automatic means for moving said mechanism radially across the sides of the core both before and during the action of said angle-varying means, means for automatically stopping said radial movement at a predetermined point, and means for then effecting a return movement of the forming mechanism, such return movement of the mechanism operating automatically to actuate the angle-varying means.

274. A tire-building machine comprising a core, mechanism for forming tire material on the sides thereof, including a device adapted to move radially with respect to the core, forming elements carried by the device and arranged to engage material on the core at an angle to the material thereon, and automatic means operating independently of the core for maintaining a predetermined angular engagement of the forming elements with the material, during a predetermined stage of the forming operation.

275. A tire-building machine comprising a core, mechanism for forming tire material on the sides thereof, including forming elements, and automatic means for moving the forming elements radially and angularly in respect to the surface of the core for automatically maintaining a predetermined angle of engagement with material on the core throughout a predetermined stage of the forming operation, and means for automatically effecting a bodily shifting movement of said forming elements at a predetermined point in the forming operation.

276. A tire-building machine comprising a core, mechanism for forming tire material on the sides thereof, including forming elements adapted to move arcuately in planes substantially corresponding to the plane of the core for maintaining a predetermined engagement of the elements with material on the core for a predetermined stage of the forming operation, means for effecting the positioning movement of the elements in relation to the core, and means for automatically shifting the forming elements at a predetermined stage of their positioning movement to vary their angle of engagement with respect to the core and with the operating faces of the forming elements as the center of the circle of their arc of movement.

277. A tire-building machine comprising a core, mechanism for forming tire material on the sides of the core, including forming elements, automatic means operating to move the elements both radially and angularly with respect to the core, and automatic means for moving the elements toward the core with a predetermined constant pressure at all times.

278. A tire-building machine comprising a core, mechanism for forming tire material on the sides thereof and including forming elements, automatic means adapted to move the forming elements both radially and angularly for positioning them at predetermined stages of their movement in relation to the surface of the core, automatic means for maintaining the elements constantly pressed against the core with a predetermined pressure, and means having a normal tendency to resist such pressure.

279. A tire-building machine comprising a core, rolls adapted to pass radially across the core for forming tire material thereon, automatic means for holding said rolls constantly against the core with a predetermined pressure, means for automatically varying the angularity of engagement of the rolls with the core, and automatic means for throwing the angularity-varying means into and out of operative position.

280. A tire-building machine comprising a core, mechanism for forming tire material thereon and including a device adapted to move radially with respect to the core, forming rolls carried by the device and arranged to engage the core at an angle to the plane thereof, and means for automatically varying the angle of engagement at any predetermined point in the course of the radial movement, such means being settable by the operator for changing the action of said angle-varying means.

281. A tire-making machine including a core, mechanism for forming tire material thereon and comprising a device adapted to move radially with respect to the core, a pair of arms pivoted on the device, supports on the arms, forming elements carried by the supports and arranged to engage material on the core, and means operating independently of the core for automatically actuating the arms to turn the supports for maintaining a predetermined angle of engagement of the forming rolls with material on the core throughout the forming operation.

282. A tire-making machine including a tire-forming core, a carriage having a to-and-fro movement in respect thereto, means for moving the carriage in both directions, a fabric former carried by and movable with the carriage, means for automatically actuating the former both toward the axis of the core and also angularly thereto, and including fluid-pressure-operated mechanism for effecting one of such movements.

283. A tire-making machine including a tire-forming core, a carriage movable in respect thereto, a fabric-forming instrumentality supported by and movable with the carriage and having both radial and angular movements in relation to the core, and fluid-pressure-operated means for automatically effecting one of such movements.

284. A tire-making machine including a tire-forming core, a carriage movable in respect thereto, a fabric-forming instrumentality supported by and movable with the carriage and having both radial and angular movements in relation to the core, fluid-pressure-operated means for automatically effecting one of such movements, and automatic means for effecting the other of such movements.

285. A tire-making machine including a tire-forming core, a tire-forming instrumentality mounted for movement in respect to the core, power-operated means for moving the former radially in respect to the core, and automatic means operating independently of the core for effecting angular movement of the former with relation to the core.

286. A tire-making machine including a tire-forming core, a tire-forming instrumentality mounted for movement in respect to the core, power-operated means for moving the former radially in respect to the core, and automatic means for effecting angular movement of the former with relation to the core, the radial and angular movements of the former being effected simultaneously and independently of the core.

287. A tire-making machine including a tire-form, a support adapted to travel toward and away from the form, automatic means active only during one movement of the support in respect to the form for positioning such support relatively thereto, fabric-pressing members carried by the support, and automatic means independent of the form for controlling the position of said members in relation to the form during both travels of the support.

288. A tire-making machine including a support, a carriage thereon, a rotatable tire-form juxtaposed on the support in relation to the carriage, a pair of pressing-members on the carriage, power operated means for effecting movement of the carriage to position the pressing-members in proximity to the tire-form, member-sustaining elements carried by the carriage and movable thereon and supporting said pressing-members, power-operated means for moving said elements during the member-positioning movement of the carriage for changing the relation of said pressing-members with respect to the tire-form, fluid-pressure operated means for effecting movement of the pressing members in relation to their supporting-elements, and means under the control of the operator for effecting actuation of said fluid-pressure operated means.

289. A tire-making machine including a support, a carriage thereon, a rotatable tire-form juxtaposed on the support in relation to the carriage, a pair of pressing-members on the carriage, power-operated means for effecting movement of the carriage to position the pressing-members in proximity to the tire-form, member-sustaining elements carried by the carriage and movable thereon and supporting said pressing-members, power operated means for moving said elements during the member-positioning movement of the carriage for changing the relation of said pressing-members with respect to the tire-form, fluid-pressure operated means for effecting movement of the pressing-members in relation to their supporting-elements, means under the control of the operator for effecting actuation of said fluid-pressure operated means, and automatic means for arresting operation of said pressure means.

290. A tire-making machine including a support, a carriage adapted to travel thereon, a power-operated means for effecting only an advancing movement of the carriage, and means for automatically arresting the carriage at any of a plurality of predetermined points and comprising stop-members, a support common to the stop-members and adapted to position one or the other in operative relation to the carriage, and means carried by the carriage and adapted to engage one or the other of the stop-members.

291. A tire-making machine including a support, a carriage adapted to travel thereon, power-operated means for effecting only an advancing movement of the carriage, and means for automatically arresting the carriage at any of a plurality of predetermined points and comprising adjustable stop-members, a support common to the stop-members and adapted to position one or the other in operative relation to the carriage, and means carried by the carriage and adapted to engage one or the other of the stop-members.

292. In a tire-making machine, a support, a presser-sustaining structure movable on the support, means for effecting movement of the structure, fabric-manipulating devices on the structure, means for arresting movement of the structure at a plurality of predetermined points, means for supplying pressure-fluid to the fabric-manipulating devices, and means automatically operated in predetermined relation to the instant of automatic arrest of the structure for cutting off supply of such pressure-fluid.

293. In a tire-making machine, a support, a traveling structure thereon, means for effecting advancing and receding movements of the structure on the support including mechanism for automatically moving the traveling structure in one direction only, means for arresting the advancing and receding movements of the support at predetermined points, fabric-manipulating devices on the structure, means for supplying and controlling the flow of pressure-medium to the fabric-manipulating devices, and a plurality of devices for operating said controlling-devices in predetermined relation to the arrest of said structure in its advancing and receding movements.

294. In a tire-making machine, a support, a traveling-structure thereon, means for effecting an advancing movement of the traveling-structure, means for automatically arresting the advancing movement thereof at any of a plurality of predetermined points, fabric-manipulating devices on the traveling structure, means for supplying and controlling a pressure medium to said fabric-manipulating devices, and means for automatically operating said controlling means in predetermined relation to the particular point of arrest of the traveling structure.

295. A tire-making machine including a support, a carriage thereon, a tire form on the support, pressing members on the carriage, power-operated means for automatically effecting movement of the carriage to position the pressing members in proximity to the form, member-sustaining elements carried by the carriage and supporting the pressing members, power-operated means for automatically moving said elements during the member-positioning movement of the carriage for changing the angular relation of the pressing members with the form, and automatic means for effecting advancing and receding movements of the pressing members in relation to their supporting elements; the automaticity of action of the specified automatic instrumentalities avoiding interposition of human agency and effecting, in each successive cycle of automatic operation thereof, substantial uniformity and certainty of results.

296. A tire-making machine including a tire-form, a support, presser-devices on the support, means for maintaining said devices in engagement with the form, means automatically actuatable while said maintaining means is operating for bodily shifting said devices on the support to change their angular relation thereto, and means for guiding said devices during their angle-changing movement.

297. The combination of a support, a rotatable tire-form, a carriage movable in relation to the form, a fabric-pressing member carried by and rotatable on a vertical axis on the carriage, actuating mechanism for automatically and bodily shifting said vertical axis of the pressing-member on the carriage during the rotation of the form, actuating mechanism for moving said carriage in relation to the form during its rotative movement, and means for automatically arresting the actuation of said carriage-actuating mechanism and the shifting of said vertical axis, respectively, when the carriage reaches predetermined positions of its movement; the automaticity of action of the specified automatic instrumentalities avoiding interposition of human agency and effecting, in each successive cycle of automatic operation thereof, substantial uniformity and certainty of results.

298. The combination of a support, a rotatable tire-form, a carriage moving in relation to the form, a fabric-pressing member carried by and rotatable on a vertical axis on the carriage, actuating mechanism for automatically and bodily shifting said pressing member on the carriage during the rotation of the form, actuating mechanism for moving said carriage in relation to the form during its rotative movement, means for automatically arresting the actuation of said carriage-actuating mechanism when the carriage reaches a predetermined position, and automatic means for moving said pressing-member in relation to the form independently of but during the movement of the carriage; the automaticity of action of the specified automatic instrumentalities avoiding interposition of human agency and effecting, in each successive cycle of automatic operation thereof, substantial uniformity and certainty of results.

299. In a tire-making machine, a rotary tire-form, fabric-pressing members to act on opposite sides of the form, a support for said members, said tire-form and support having relative movement to make the fabric-pressing members traverse the form substantially radially thereof, automatic means for applying pressure to the fabric-pressing members to force them towards the central plane of the form and for automatically guiding them during their traversing movement, and means for causing automatic retraction of the fabric-pressing members laterally from the form and from each other when the said pressure is relieved; the automaticity of action of the specified automatic instrumentalities avoiding interposition of human agency and effecting, in each successive cycle of automatic operation thereof, substantial uniformity and certainty of results.

300. In a tire-making machine, a rotary tire-form, fabric-pressing members to act on opposite sides of the form, a support for said members, said tire-form and support having relative movement to make the fabric-pressing members traverse the form substantially radially thereof, automatic means for applying pressure to the fabric-pressing members to force them towards the central plane of the form during their traversing movement, and means deriving action through movement of the support for causing automatic retraction of the fabric-pressing members laterally from the form and from each other when the said pressure is relieved and maintaining them retracted while the normal separated relation of the tire-form and said support for the fabric-pressing members is being resumed, substantially as described.

301. In a tire-making machine, a rotary tire-form, fabric-pressing members to act on opposite sides of the tire-form, a support for the said members, said tire-form and support having relative movement to make the fabric-pressing members traverse the form substantially radially thereof, automatic means for applying pressure to the fabric-pressing members to force them towards the central plane of the form during their traversing movement, means for causing automatic retraction of the fabric-pressing members laterally from the form and from each other when the said pressure is relieved, each of said pressing members being pivotally mounted to change their angular position in relation to the form, and means for automatically turning said members; the automaticity of action of the specified automatic instrumentalities avoiding interposition of human agency and effecting, in each successive cycle of automatic operation thereof, substantial uniformity and certainty of results.

302. In a tire-making machine, a rotary tire-form, a support, one of said parts being movable relative to the other, and fabric-pressing members having the following characteristics, pivotally mounted on the support for changing their angular relation to the tire-form; movable towards the central plane of the tire-form under a follow-up pressure as they are traversing said form radially thereof; individually yieldable to compensate for irregularities in the work, and automatically retracted laterally from the sides of the form upon cessation of said follow-up pressure in combination with automatic means for effecting said change of angular relation of the members, and for moving them toward said central plane; the automaticity of action of the specified automatic instrumentalities avoiding interposition of human agency and effecting, in each successive cycle of automatic operation thereof, substantial uniformity and certainty of results.

303. In a tire-making machine, a rotatable tire-form, a support, one of said parts being movable towards and from the other, fabric-pressing means for traversing the sides of the tire-form, automatic means for forcing the fabric-pressing members against the material on the tire-form, automatic means for changing the angular position of the fabric-pressing members in relation to the work on the form, and means for automatically moving the fabric-pressing members laterally away from the sides of the form when the action of the said forcing means ceases; the automaticity of action of the specified automatic instrumentalities avoiding interposition of human agency and effecting, in each successive cycle of automatic operation thereof, substantial uniformity and certainty of results.

304. In a tire-making machine, a rotary tire-form, a support, one of said parts being movable relative to the other, and fabric-pressing members to operate on opposite sides of the form having the following characteristics, shiftably mounted on the support with automatic means for changing their angular relation to the work on the tire-form, movable against the work on the tire-form under follow-up pressure as they traverse said form radially thereof, individually yieldable to compensate for irregularities in the work, and automatically and simultaneously retracted laterally from the sides of the form upon cessation of said follow up pressure; the automaticity of action of the specified automatic instrumentalities avoiding interposition of human agency and effecting, in each successive cycle of automatic operation thereof, substantial uniformity and certainty of results.

305. In combination, a tire-form, a support, one of which has movement towards and from the other, fabric-pressing members on the support which are caused by said relative movement to traverse the material on the form, in a direction substantially radial to the form, said members having movement laterally of the form to press the material thereagainst, and automatic means for exerting pressure to effect said lateral movement, said members having automatic separating movement from each other and laterally from the sides of the form when said pressure ceases, and effected through the relative traversing movement of the form and support, substantially as described; the automaticity of action of the specified automatic instrumentalities avoiding interposition of human agency and effecting, in each successive cycle of automatic operation thereof, substantial uniformity and certainty of results.

306. In a tire-making machine, a rotary tire-form, fabric-pressing members to act on opposite sides of the tire-form, a support for the said members, said tire-form and support having relative movement to make the fabric-pressing members traverse the form substantially radially thereof, means for automatically applying pressure to the fabric-pressing members from a source of power common to them both to force them towards the central plane of the form uniformly during their traversing movement, said fabric-pressing members being supported on vertical pivots about whose axes they turn, and means for automatically turning said members uniformly and simultaneously to change their angular positions in relation to the form; the automaticity of action of the specified automatic instrumentalities avoiding interposition of human agency and effecting, in each successive cycle of automatic operation thereof, substantial uniformity and certainty of results.

307. In a tire-making machine, a rotary tire-form, fabric-pressing members to act on opposite sides of the form, a support for said members, said form and support having relative movement to make the pressing members traverse the form substantially radially thereof, automatic means common to both pressing members to force them against the fabric on the form substantially uniformly during the traverse of said pressing members along the sides of the form, and means for automatically, simultaneously and substantially uniformly changing the angular position of the pressing members in relation to the form; the automaticity of action of the specified automatic instrumentalities avoiding interposition of human agency and effecting, in each successive cycle of automatic operation thereof, substantial uniformity and certainty of results.

308. In combination, a rotary tire-form, a support, one of said parts being movable towards and from the other, fabric-pressing members on the support, one for each side of the form to traverse the same substantially radially of the form, automatic means for causing the holding of the fabric-pressing members normally retracted laterally from the sides of the form, and automatic means for imposing a follow-up pressure to the fabric-pressing members for advancing them simultaneously against the form and in opposition to said holding means during their traversing movement radially thereof, said advancing pressure means being common to both fabric-pressing devices; the automaticity of action of the specified automatic instrumentalities avoiding interposition of human agency and effecting, in each successive cycle of automatic operation thereof, substantial uniformity and certainty of results.

309. In a tire-building machine, a rotary tire-form, a support, means for moving one of said parts relative to the other, fabric-pressing members movably mounted on the support, one for each side of the tire-form, to traverse the sides of the form, as a result of the relative movement of the said parts, means for automatically arresting the movable part at a predetermined point in the traverse of said members, and means for automatically forcing the fabric-pressing members against the sides of the form and for automatically retracting them away laterally from the sides of the form when the action of said fabric-pressing means upon the form ceases; the automaticity of action of the specified automatic instrumentalities avoiding interposition of human agency and effecting, in each successive cycle of automatic operation thereof, substantial uniformity and certainty of results.

310. In a tire-building machine, a rotary tire-form, a support, means for moving one of said parts relative to the other, fabric-pressing members movably mounted on the support, one for each side of the tire-form to traverse the sides of the form, as a result of the relative movement of the said parts, means for automatically turning the fabric-pressing members to different angular relations to the sides of the form, means for automatically forcing the said fabric-pressing members against the sides of the form and for automatically retracting them laterally away from the sides of the form, and means for automatically releasing the moving part from its driving means for the separation of the tire-form and support to normal position; the automaticity of action of the specified automatic instrumentalities avoiding interposition of human agency and effecting, in each successive cycle of automatic operation thereof, substantial uniformity and certainty of results.

311. A tire-making machine including a support, power-operated means for effecting advancing movement of the support, a fabric-pressing member on and movable with the support, a tire-form juxtaposed to the pressing-member, and automatic means to operate the support for thrusting said member towards the form and under control of the operator initially to position said member, said means thereafter operating to transmit yielding pressure to force the pressing-member against the form yieldingly to make it follow the surface configuration of the tire-form; the automaticity of action of the specified automatic instrumentalities avoiding interposition of human agency and effecting, in each successive cycle of automatic operation thereof, substantial uniformity and certainty of results.

312. In a tire-making machine, a tire-form, a carriage to have forward and backward movement relative to the form, fabric-pressing members on the carriage to act on opposite sides of the form, means for automatically pressing the members against the form, said members also having automatic separating movement after said pressing action ceases, means for moving the carriage forward, means for automatically arresting the forward movement of the carriage, and manually operating means for determining the time at which the carriage will perform its forward stroke, substantially as described; the automaticity of action of the specified automatic instrumentalities avoiding interposition of human agency and effecting, in each successive cycle of automatic operation thereof, substantial uniformity and certainty of results.

313. The combination of a support, a rotatable form, a movable carriage shiftable in relation to the form, roller-sustaining means on the movable carriage, a fabric-roller carried by the sustaining means and bodily shiftable thereon, power-operated means operative to move the movable carriage automatically relative to the form, means to move the sustaining means automatically relative to the form during the movement of the movable carriage, and means for automatically moving the roller on the sustaining means and relatively to said form during the movement of both the sustaining means and the carriage; the automaticity of action of the specified automatic instrumentalities avoiding interposition of human agency and effecting, in each successive cycle of automatic operation thereof, substantial uniformity and certainty of results.

314. In combination, a tire-form, a carriage, fabric-pressing members on opposite sides of the form, power-operated means for automatically forcing them towards each other and the form and for automatically retracting them laterally from the form and from each other, a power-operated element for advancing the carriage, means for disconnecting the carriage from the power-operated element, and independent means for returning the carriage to normal position independently of said power-operated element; the automaticity of action of the specified automatic instrumentalities avoiding interposition of human agency and effecting, in each successive cycle of automatic operation thereof, substantial uniformity and certainty of results.

In testimony whereof, I have affixed my signature in presence of two witnesses.

JOHN J. CONVERY.

Witnesses:
W. P. SEIBERLING,
A. N. JOHNSON.